United States Patent [19]

Togawa et al.

[11] Patent Number: 5,434,934
[45] Date of Patent: Jul. 18, 1995

[54] MAGNETO-OPTICALLY MODULATING SYSTEM

[75] Inventors: Masayuki Togawa; Kiyoshi Toyama; Minoru Takeda; Morio Kobayashi, all of Gifu, Japan

[73] Assignee: Teijin Seiki Co., Ltd., Osaka, Japan

[21] Appl. No.: 250,504

[22] Filed: May 27, 1994

[30] Foreign Application Priority Data

Jun. 3, 1993 [JP] Japan .................. 5-133081

[51] Int. Cl.6 .............................. G02B 6/10
[52] U.S. Cl. ............................ 385/6; 385/3; 385/4; 324/244.1
[58] Field of Search ............. 385/6, 3, 4, 5, 11, 385/15, 16; 250/227.14, 227.17, 225; 359/280, 281, 282, 283; 324/96, 175, 244.1

[56] References Cited

U.S. PATENT DOCUMENTS

| | | | |
|---|---|---|---|
| 4,947,035 | 8/1990 | Zook et al. | 250/255 |
| 5,042,905 | 8/1991 | Anjan et al. | 385/13 |
| 5,281,912 | 1/1994 | Togawa et al. | 324/244.1 |

FOREIGN PATENT DOCUMENTS 0319172 6/1989 European Pat. Off. .

OTHER PUBLICATIONS

"Sensors–A Comprehensive Survey", Gopel et al., Optical Sensors, vol. 6, 1992 VCH, Weinheim No Month.

Primary Examiner—Rodney B. Bovernick
Assistant Examiner—Phan T. H. Palmer
Attorney, Agent, or Firm—Lane, Aitken & McCann

[57] ABSTRACT

A method of magneto-optically modulating light comprises the steps of linearly polarizing the light on its transmission path, placing a magnetooptic effect element on the transmission path of the polarized light with the spontaneous magnetization direction of the element being parallel with the transmission path, the polarized light being modulated into a first light component when the plane of polarization of the polarized light is rotated to assume the first rotational position by the magnetooptic effect element in the absence of the applied magnetic field, applying the magnetic field to the magnetooptic effect element with the internal magnetization of the element being oriented in a direction perpendicular to the transmission path, the polarized light being modulated into a second light component when the plane of polarization of the polarized light is shifted to a second rotational position by the magnetooptic effect element in the presence of the applied magnetic field. According to the method, the light is modulated under the condition that the transmission path is perpendicular to the applied magnetic field, thereby making it possible to direct the transmission path in one of a variety of different directions respectively perpendicular to the direction of the applied magnetic field.

34 Claims, 14 Drawing Sheets

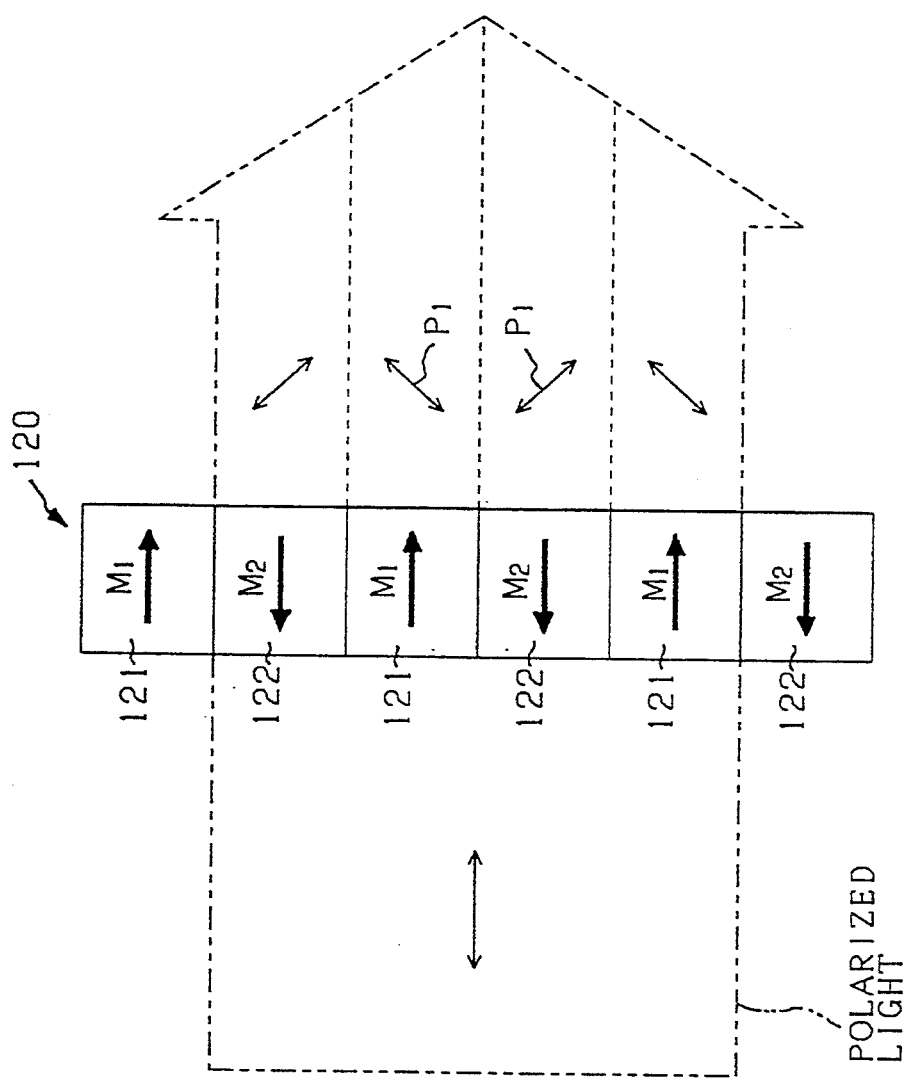

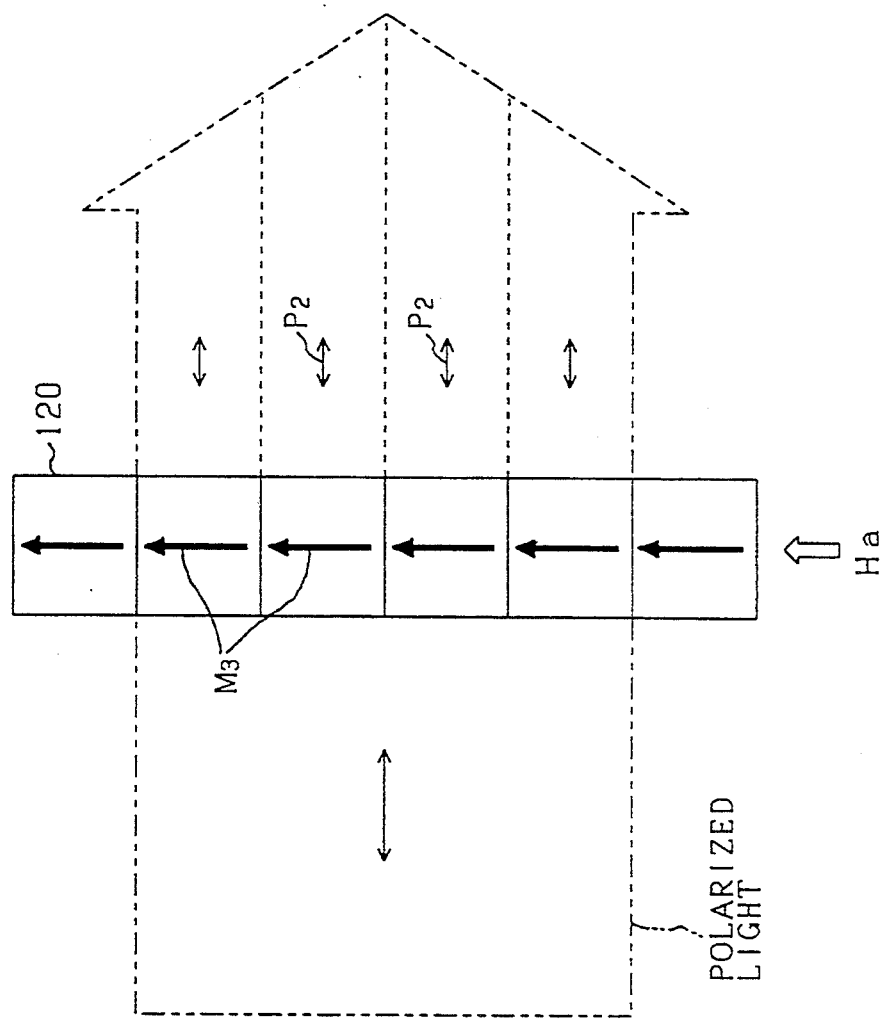

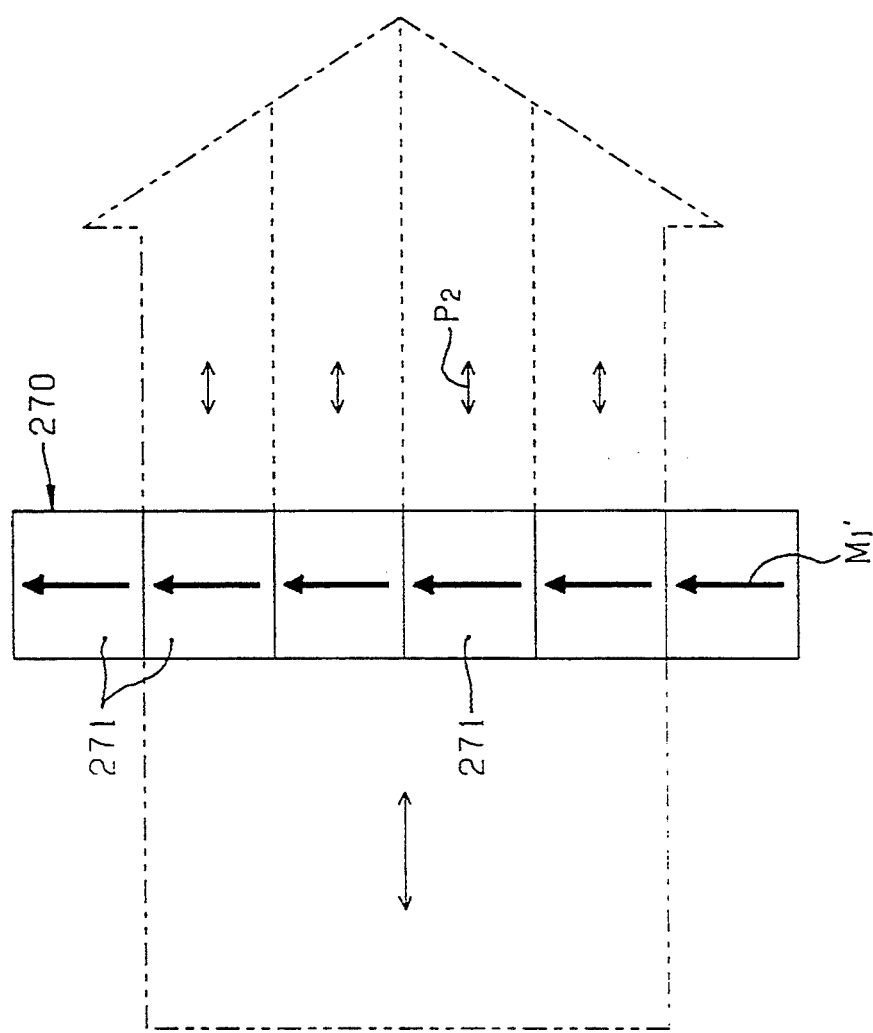

5,434,934

MAGNETO-OPTICALLY MODULATING SYSTEM

FIELD OF THE INVENTION

The present invention relates to a magneto-optically modulating system, and more particularly to a method of and apparatus for magneto-optically modulating light by utilizing a magnetooptic effect element which is capable of rotating the plane of polarization of the polarized light while the polarized light passes through the magnetooptic effect element.

DESCRIPTION OF THE PRIOR ART

There has so far been proposed a wide variety of optical modulating systems which can be adopted, for example, to position sensing apparatus such as linear scales or linear/rotary encoders. A typical prior-art position sensing apparatus utilizing the optical modulation comprises a light source element for emitting light beam, a light receiving element placed in opposite relationship to the light source element so as to receive the light beam from the light source element, and an encoder plate formed with a plurality of slits and disposed between the light source element and the light receiving element. The encoder plate is adapted to be movable in a direction perpendicular to the propagation direction of the light beam emitted from the light source element with respect to the light source element and the light receiving element. The encoder plate is moved with respect the light source element and the light receiving element alternately to allow the light beam emitted from the light source element to be received by the light receiving element through the slits of the encoder plate and to prevent the light beam emitted from the light source from being received by the light receiving element, thereby producing the optical signal based on the movement of the encoder plate with respect to the light source element and the light receiving element.

The prior-art position sensing apparatus thus constructed, however, has a drawback in that the light beam is apt to be interrupted between the light source element and the light receiving element, since the light beam is propagated in the air between the light source and the light receiving element and accordingly interrupted by dew and dust in the air, particularly under a coarse environment.

To avoid such a drawback, there has been proposed an improved position sensing apparatus, for instance, disclosed in Japanese Laid-open Patent Publication No. 1-224623 and shown in FIG. 20. A sensor head of the prior-art improved position sensing apparatus is shown in FIG. 20 as comprising a Faraday effect element 97 having a reflecting portion 98 opposing to a magnetic scale 83 having a plurality of magnetized segments 83a attached thereto, a polarizer 96a for polarizing light beam emitted from the light source element (not shown) to guide the polarized light beam to the Faraday effect element 97, and an analyzer 100a for analyzing the light beam reflected by the reflecting portion 98 of the Faraday effect element 97 to output the analyzed light beam to an opt-electric converting element (not shown). The sensor head of the position sensing apparatus further comprises an input optical waveguide element 91a connected at its one end to an input optical fiber 94a and at its the other end to the polarizer 96a, and an output optical waveguide element 92a at its one end to the analyzer 100a and at its the other end to an output optical fiber 95a.

The Faraday effect element 97 is designed to direct the light beam to the reflecting portion 98 of the Faraday effect element 97 and guide the light beam reflected by the reflecting portion 98 to the analyzer 100a. The Faraday effect element 97 is adapted to optically rotate the plane of polarization of the polarized light being passing therethrough in accordance with the magnetism of the magnetized segments 99a arranged on the magnetic scale 83 movable with respect to the Faraday effect element 97 in a direction X shown in FIG. 20. The optical signal reflected by the reflecting means 98 again passes through the Faraday effect element 97 and is guided to the analyzer 100a which is adapted to allow only an optical signal having a predetermined plane of polarization to pass therethrough. That is, in the case the plane of polarization is optically rotated by the Faraday effect element 97, the analyzer 100a interrupts the light beam, and in the case there is no rotation of plane of polarization, the analyzer 100a allows the light beam to pass therethrough. Therefore, the relative position of the scale member 83 with respect to the sensor head can be detected on the basis of the light beam outputted from the output optical fiber 95a. The input and output optical fibers 94a, 95a, the input and output optical waveguides 91a, 92a, the polarizer 96a, the Faraday effect element 97 and the analyzer 100a are held in tight contact with one another in order not to propagate the light beam in the air and accordingly the light beam is prevented from being interrupted by dew and dust in the air.

However, the prior-art improved position sensing apparatus also has a drawback in that the light beam in the sensor head is required to be propagated in roughly perpendicular relationship to the moving direction X of the scale member 83 in view of the operational principle of the Faraday effect element and as a result the sensor head of the position sensing apparatus is restricted in the arrangement of the optical elements collectively forming the sensor head. This means that it is difficult to provide a small sized sensor head shorten in a direction perpendicular to the moving direction X of the scale member 83.

An object of the present invention is to provide a further improved position sensing method and apparatus which will eliminate the drawback thus encountered in the prior-art improved position sensing system of the above described nature.

SUMMARY OF THE INVENTION

According to a first aspect of the present invention there is provided a method of magneto-optically modulating light to produce an optical signal, comprising the steps of preparing polarized light producing means for producing polarized light linearly polarized on its transmission path and having a plane of polarization rotatable about the transmission path of the polarized light to assume two different positions consisting of a first rotational position in which the polarized light is modulated into a first light component and a second rotational position in which the polarized light is modulated into a second light component, a magnetooptic effect element made of a ferromagnetic substance spontaneously magnetized to have a spontaneous magnetization direction, and magnetic field applying means for applying a magnetic field to the magnetooptic effect element to orient internal magnetization of the magnetooptic effect element, placing the magnetooptic effect element on the transmission path of the polarized light with the spontaneous magnetization direction of the magnetooptic effect element being substantially parallel with the transmission path of the polarized light, so that the plane of polarization of the polarized light is rotated in a first rotational direction about the transmission path of the polarized light to assume the first rotational position while the polarized light passes through the magnetooptic effect element, and applying the magnetic field to the magnetooptic effect element with the internal magnetization of the magnetooptic effect element being oriented in a direction substantially perpendicular to the transmission path of the polarized light, so that the plane of polarization of the polarized light is rotated in a second rotational direction opposite to the first rotational direction about the transmission path of the polarized light to assume the second rotational position while the polarized light passes through the magnetooptic effect element, the optical signal being constituted by the first and second light components.

According to a second aspect of the present invention there is provided a method of magneto-optically modulating light to produce an optical signal, comprising the steps of preparing polarized light producing means for producing polarized light linearly polarized on its transmission path and having a plane of polarization rotatable about the transmission path of the polarized light to assume two different positions consisting of a first rotational position in which the polarized light is modulated into a first light component and a second rotational position in which the polarized light is modulated into a second light component, a magnetooptic effect element made of a ferromagnetic substance spontaneously magnetized to have a spontaneous magnetization direction, and magnetic field applying means for applying a magnetic field to the magnetooptic effect element to orient internal magnetization of the magnetooptic effect element, placing the magnetooptic effect element on the transmission path of the polarized light with the spontaneous magnetization direction of the magnetooptic effect element being substantially perpendicular to the transmission path of the polarized light, applying the magnetic field to the magnetooptic effect element with the internal magnetization of the magnetooptic effect element being oriented in a direction substantially parallel with the transmission path of the polarized light, so that the plane of polarization of the polarized light is rotated in a first rotational direction about the transmission path of the polarized light to assume the first rotational position while the polarized light passes through the magnetooptic effect element, and removing the magnetic field applied to the magnetooptic effect element on the transmission path of the polarized light, so that the plane of polarization of the polarized light is rotated in a second rotational direction to assume the second rotational position while the polarized light passes through the magnetooptic effect element, the optical signal being constituted by the first and second light components.

According to a third aspect of the present invention there is provided a position sensing apparatus utilizing magnetooptic modulation, comprising polarized light producing means for producing polarized light linearly polarized on its transmission path and having a plane of polarization rotatable about the transmission path of the polarized light to assume two different rotational positions consisting of first rotational position in which the polarized light is modulated into a first light component and a second rotational position in which the polarized light is modulated into a second light component, a magnetooptic effect element made of a ferromagnetic substance spontaneously magnetized and placed on the transmission path of the polarized light to have a spontaneous magnetization direction substantially parallel with the transmission path of the polarized light, the plane of polarization of the polarized light being rotated by the magnetooptic effect element at a specific rotational angle to assume the first rotational position while the polarized light passes through the substance, a magnetic field applying unit applying a magnetic field to the magnetooptic effect element to orient internal magnetization of the magnetooptic effect element in a direction substantially perpendicular to the transmission path of the polarized light, the rotational angle of the plane of polarization of the polarized light being reduced by the magnetic field applying unit to allow the plane of polarization to shift from the first rotational position to the second rotational position while the polarized light passes through the substance, the magnetic field applying unit and the magnetooptic effect element being movable with respect to each other, and optically analyzing means for analyzing the first and second light components each passing through the magnetooptic effect element to select one from the first and second light components, the optical signal being constituted by the first and second light components.

According to a fourth aspect of the present invention there is provided a position sensing apparatus utilizing magnetooptic modulation, comprising polarized light producing means for producing polarized light linearly polarized on its transmission path and having a plane of polarization rotatable about the transmission path of the polarized light to assume two different rotational positions consisting of first rotational position in which the polarized light is modulated into a first light component and a second rotational position in which the polarized light is modulated into a second light component, the plane of polarization initially assuming the first rotational position, a magnetooptic effect element made of a ferromagnetic substance spontaneously magnetized and placed on the transmission path of the polarized light to have a spontaneous magnetization direction substantially perpendicular to the transmission path of the polarized light, a magnetic field applying unit for applying a magnetic field to the magnetooptic effect element to orient internal magnetization of the magnetooptic effect element in a direction substantially parallel with the transmission path of the polarized light, the plane of polarization of the polarized light being rotated by the magnetooptic effect element under the influence of the applied magnetic field at a specific rotational angle to assume the second rotational position while the polarized light passes through the magnetooptic effect element in the presence of the applied magnetic field, the plane of polarization of the polarized light being maintained to assume the first rotational position while the polarized light passes through the magnetooptic effect element in the absence of the applied magnetic field, the magnetic field applying unit and the magnetooptic effect element being movable with respect to each other, and optically analyzing means for analyzing the first and second light components each passing through the magnetooptic effect element to select one from the first and second light components, the optical signal being constituted by the first and second light components.

According to a fifth aspect of the present invention there is provided a position sensing apparatus utilizing magnetooptic modulation to perform multiplexing detection, comprising polarized light producing means for producing a plurality of polarized lights linearly polarized on their respective transmission paths and each having a plane of polarization rotatable about the transmission path of each of the polarized lights to assume two different rotational positions consisting of a first rotational position in which the polarized light is modulated into a first light component and a second rotational position in which the polarized light is modulated into a second light component, a magnetooptic effect element having a plurality of magnetized segments each made of a ferromagnetic substance spontaneously magnetized to have a spontaneous magnetization direction substantially parallel with each of the transmission paths of the polarized lights and respectively placed on the transmission paths of the polarized lights, each of the planes of polarization of the polarized lights being rotated at a specific rotational angle about each of the transmission paths of the polarized lights to assume the first rotational position while the each of the polarized lights passes through the magnetooptic effect element, a magnetic field applying unit having a plurality of magnetic scale members respectively facing to the magnetized segments of the magnetooptic effect element and each applying a magnetic field to each of the magnetized segments of the magnetooptic effect element to orient internal magnetization of each of the magnetized segments in a direction substantially perpendicular to the transmission paths of the polarized lights, each of the planes of polarization of the polarized lights assuming the second rotational position while each of the polarized lights passes through the magnetooptic effect element, the magnetic field applying unit and the magnetooptic effect element being movable with respect to each other, and optically analyzing means for analyzing the first and second light components each passing through one of the magnetized segments of the magnetooptic effect element and selectively outputting the first and second light components, the outputted one of the first and second light components constituting each of a plurality of optical signals to be used for the multiplexing detection.

According to a sixth aspect of the present invention there is provided a position sensing apparatus utilizing magnetooptic modulation to perform multiplexing detection, comprising polarized light producing means for producing a plurality of polarized lights linearly polarized on their respective transmission paths and each having a plane of polarization rotatable about the transmission path of each of the polarized lights to assume two different rotational positions consisting of a first rotational position in which the polarized light is modulated into a first light component and a second rotational position in which the polarized light is modulated into a second light component, a magnetooptic effect element having a plurality of magnetized segments each made of a ferromagnetic substance spontaneously magnetized to have a spontaneous magnetization direction substantially perpendicular to each of the transmission paths of the polarized lights and respectively placed on the transmission paths of the polarized lights, each of the planes of polarization of the polarized lights assuming the first rotational position while each of the polarized lights passes through the magnetooptic effect element, a magnetic field applying unit having a plurality of magnetic scale members respectively facing to the magnetized segments of the magnetooptic effect element and each applying a magnetic field to each of the magnetized segments of the magnetooptic effect element to orient internal magnetization of each of the magnetized segments in a direction substantially parallel with the transmission paths of the polarized lights, each of the planes of polarization of the polarized lights being rotated at a specific rotational angle about each of the transmission paths of the polarized lights to assume the first rotational position while the each of the polarized lights passes through the magnetooptic effect element the magnetic field applying unit and the magnetooptic effect element being movable with respect to each other, and optically analyzing means for analyzing the first and second light components each passing through one of the magnetized segments of the magnetooptic effect element and selectively outputting the first and second light components, the outputted one of the first and second light components constituting each of a plurality of optical signals to be used for the multiplexing detection.

According to a seventh aspect of the present invention there is provided an optical switch utilizing magnetooptic modulation to make and break an optical transmission line between two optical units one of which produces polarized light linearly polarized on its transmission path to have a plane of polarization rotatable about two different rotational positions consisting of a first rotational position in which the polarized light is modulated into a first light component and a second rotational position in which the polarized light is modulated into a second light component, the optical switch comprising a magnetooptic effect element put in position between the two optical units and made of a ferromagnetic substance spontaneously magnetized to have a spontaneous magnetization direction substantially parallel with the transmission path of the polarized light, the rotational position of the plane of polarization of the polarized light being shifted by the magnetooptic effect element to the first rotational position from the second rotational position while the polarized light passes through the magnetooptic effect element in the absence of applied magnetic field, a magnetic field applying unit applying a magnetic field to the magnetooptic effect element to orient internal magnetization of the magnetooptic effect element in a direction substantially perpendicular to the transmission path, the rotational position of the plane of polarization of the polarized light being shifted by the internal magnetization of the magnetooptic effect element to second rotational position from first rotational position while the polarized light passes through the magnetooptic effect element in the presence of the magnetic field; and optically analyzing means for analyzing the first and second light components each passing trough the magnetooptic effect element and selectively outputting one of the first and second light components to be received by the other of the two optical units.

According to an eighth aspect of the present invention there is provided an optical switch utilizing magnetooptic modulation to make and break an optical transmission line between two optical units one of which produces polarized light linearly polarized on its transmission path to have a plane of polarization rotatable about two different rotational positions consisting of a first rotational position in which the polarized light is modulated into a first light component and a second rotational position in which the polarized light is modulated into a second light component, the optical switch comprising a magnetooptic effect element put in position between the two optical units and made of a ferromagnetic substance spontaneously magnetized to have a spontaneous magnetization direction substantially perpendicular to the transmission path of the polarized light, the rotational position of the plane of polarization of the polarized light being shifted by the spontaneous magnetization of the magnetooptic effect element to the first rotational position from the second rotational position while the polarized light passes through the magnetooptic effect element, a magnetic field applying unit applying a magnetic field to the magnetooptic effect element to orient internal magnetization of the magnetooptic effect element in a direction substantially perpendicular to the transmission path, the rotational position of the plane of polarization of the polarized light being shifted by the internal magnetization of the magnetooptic effect element to the second rotational position from the first rotational position while the polarized light passes through the magnetooptic effect element in the presence of the magnetic field; and optically analyzing means for analyzing the first and second light components each passing trough the magnetooptic effect element and selectively outputting one of the first and second light components to be received by the other of the two optical units.

BRIEF DESCRIPTION OF THE DRAWINGS

The features and advantages of a magneto-optically modulating system in accordance with the present invention will be more clearly understood from the following description taken in conjunction with the accompanying drawings where:

FIGS. 3a and 3b are schematic views showing different magnetizing behaviors of the magnetooptic effect element;

FIGS. 16a and 16b are schematic views showing different magnetizing behaviors of the magnetooptic effect element illustrated in FIG. 15;

DESCRIPTION OF THE PREFERRED EMBODIMENTS

Figure 1:
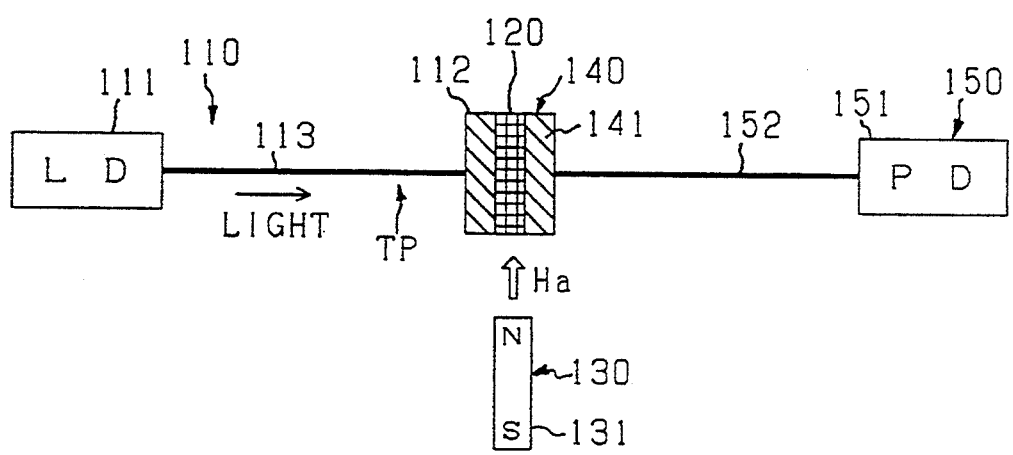
FIG. 1 is a plan view of a first embodiment of the position sensing apparatus according to the present invention.

Referring now to FIGS. 1 to 4 of the drawings, firstly particularly to FIG. 1 thereof, a first preferable embodiment of a position sensing apparatus according to the present invention comprises polarized light producing means 110 for producing polarized light linearly polarized on its transmission path TP, and a magnetooptic effect element 120 made of a ferromagnetic substance spontaneously magnetized and placed on the transmission path TP of the polarized light to have a spontaneous magnetization direction substantially parallel with the transmission path TP of the polarized light.

The polarized light producing means 110 is shown in FIG. 1 as including a semiconductor laser 111 which is adapted to stimulate emission of radiation to produce laser light composed of a plurality of parallel bundles of rays, and a polarizer 112 held in tight contact with the magnetooptic effect element 120 and linearly polarizing the laser light emitted from the semiconductor laser 111. The semiconductor laser 111 may be a laser diode or the like. The polarized light producing means 110 further comprises a first optical fiber 113 connected at one end to the semiconductor laser 111 and at the other end to the magnetooptic effect element 120 through the polarizer 112 for guiding the laser light emitted from the semiconductor laser 111 to the magnetooptic effect element 120. The aforesaid semiconductor laser 111 forms a light source emitting light on its transmission path TP. The aforesaid first optical fiber 113 forms optical wave guiding means for guiding the light emitted from the light source along the transmission path TP of the light.

Figure 2A:
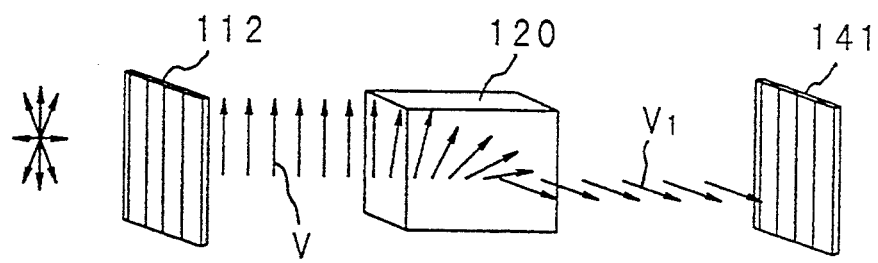
FIGS. 2a and 2b are exploded perspective views showing the operational principle of the position sensing apparatus illustrated in FIG. 1.
Figure 2B:
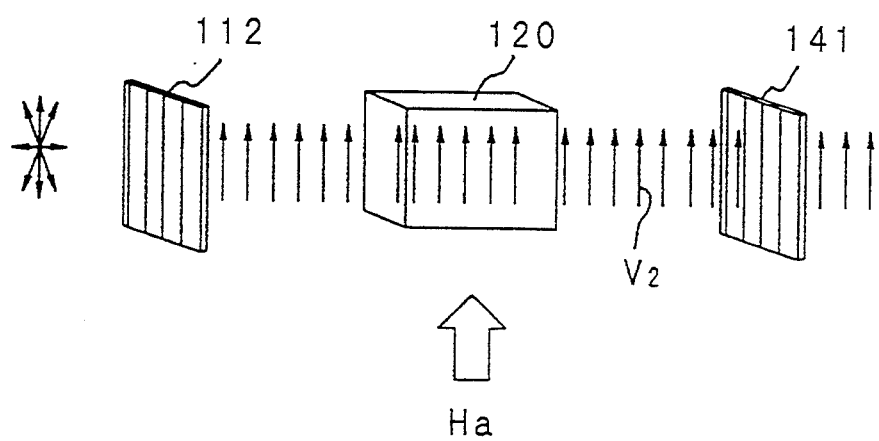

The polarized light linearly polarized by the polarizer 112 not only has an electric vector shown, for instance, by an arrow V in FIG. 2a at a point on the transmission path TP and oriented with respect to the propagation direction of the laser light in a direction according to the polarizer 112, but also has a plane of polarization defined by the electric vector and the propagation direction of the laser light.

The magnetooptic effect element 120 is made of a substantially transparent ferromagnetic substance such as a magnetic single-crystal iron-garnet to be magnetically "soft". As shown in FIG. 3a, the ferromagnetic substance forming the magnetooptic effect element 120 is composed of an assemblage of spontaneously magnetized regions, i.e., magnetic domains 121, 122 each spontaneously magnetized to have a spontaneous magnetization direction substantially parallel with the transmission path TP of the polarized light. For simplicity, each of the schematic representations of FIGS. 3a and 3b shows only three pairs of adjacent magnetic domains 121, 122 having respective spontaneous magnetization directions shown by parallel arrows $M_1$ and $M_2$ opposite to each other. As a matter of fact, the substantially transparent ferromagnetic substance of the magnetooptic effect element 120 has a quiescent maze pattern of magnetic domains 121, 122 on a section perpendicular to the transmission path of the polarized light.

Turning back to FIG. 1, the position sensing apparatus further comprises magnetic field applying means 130 which comprises a permanent magnet 131 supported by a movable support unit not shown and movable toward and away from the magnetooptic effect element 120. The movement direction of the magnet 131 is, for example, substantially parallel to the transmission path TP of the polarized light. The magnetic field applying means 130 is designed to apply a magnetic field Ha to the magnetooptic effect element 120 in a specific direction substantially perpendicular to the transmission path of the polarized light. When the magnetic field Ha is applied to the magnetooptic effect element 120, the magnetooptic effect element 120 becomes birefringent and the transverse magnetooptic birefrengence, viz., the Voigt effect is observed within the magnetooptic effect element 120. The direction of the magnetic field Ha, the direction of the electric vector of the incident polarized light and a crystallization direction of the magnetooptic effect element 120 are so determined as to reduce the function of the magnetooptic effect element 120 to elliptically polarize the incident light for the Voigt effect also called the Cotton-Mouton effect and to rotate the major axis of the elliptically polarized light for the Voigt effect. The magnetic field Ha applied to the magnetooptic effect element 120 in the specific direction causes the magnetooptic effect element 120 to orient internal magnetization in the specific direction substantially perpendicular to transmission path TP of the polarized light as shown by a plurality of arrows $M_3$ in FIG. 3b.

The plane of polarization of the polarized light is rotated about the transmission path TP of the polarized light by the magnetooptic effect element 120 to assume two different rotational positions consisting of a first rotational position in which the polarized light is modulated into a first light component and a second rotational position in which the polarized light is modulated into a second light component. In other words, the plane of polarization of the polarized light is optically rotated due to the Faraday effect on condition that each of the magnetic domains 121, 122 of the magnetooptic effect element 120 is spontaneously magnetized in the direction substantially parallel with the transmission path TP of the polarized light in the absence of the magnetic field Ha applied by the magnetic field applying means 130. When the plane of polarization assumes the first rotational position, the electric vector of the polarized light is oriented in a direction shown by an arrow $V_1$ in FIG. 2a. When, on the other hand, the plane of polarization assumes the second rotational position, the electric vector of the polarized light is oriented in a direction shown by an arrow $V_2$ in FIG. 2b. As will be understood from FIG. 2a, the plane of polarization of the polarized light is rotated by the magnetooptic effect element 120 at a specific rotational angle, for example, at a right angle to assume the first rotational position while the polarized light passes through the magnetooptic effect element 120 in the absence of the applied magnetic field Ha. This rotation of the plane of polarization is also called a Faraday rotation. More particularly, as shown in FIG. 3a, each of the magnetic domains 121, 122 of the magnetooptic effect element 120 causes the Faraday rotation at the specific rotational angle in the absence of the magnetic field Ha applied to the magnetooptic effect element 120 by the magnetic field applying means 130. In FIG. 3a, the first rotational position $P_1$ is shown by a plurality of oblique arrows each having one of two different rotational directions to distinguish the rotational directions of the planes of polarization of polarized light beams respectively passing through the adjacent domains 121, 122 of the magnetooptic effect element 120.

The rotational angle of the plane of polarization of the polarized light is reduced, for example, minimized by the magnetooptic effect element 120 under the influence of the magnetic field Ha applied by the magnetic field applying means 130. As a consequence, the plane of polarization of the polarized light is shifted from the first rotational position $P_1$ to the second rotational position $P_2$ substantially identical to the initial rotational position of the polarized light. More particularly, as shown in FIG. 3b, the plane of polarization of the polarized light is substantially maintained at the initial rotational position of the polarized light while the polarized light passes through the magnetic domains 121, 122 of the magnetooptic effect element 120 under the influence of the magnetic field Ha, since the rotational angle of the plane of polarization of the polarized light is reduced by the magnetooptic effect element 120 to allow the plane of polarization to assume the second rotational position $P_2$. Thus, the polarized light is modulated into a first light component when the plane of polarization is rotated to the first rotational position $P_1$, while the polarized light is modulated into a second light component when the plane of polarization is rotated to the second rotational position $P_2$.

The position sensing apparatus further comprises optically analyzing means 140 for analyzing the first and second light components to select one from the first and second light components as an optical signal, and photo-electric converting means 150 for converting the outputted optical signal into an electric signal. The optically analyzing means 140 is shown in FIG. 1 as comprising an analyzer 141 held in tight contact with the magnetooptic effect element 120 in such a manner that the polarizer 112 and the analyzer 141 are held in parallel Nicols state for allowing only a polarized light having a specific electric vector to pass therethrough. The photo-electric converting means 150 is shown in FIG. 1 as comprising a photo diode 151 for detecting the selected one of the first and second light components and a second optical fiber 152 connected at one end to the analyzer 141 and at the other end to the photo diode 151 for guiding the polarized light from the analyzer 141 to the photo diode 151.

The operation of the position sensing apparatus thus constructed and mentioned above will hereinafter be described in detail.

The laser light emitted from the semiconductor laser 11 is transmitted to the one end portion of the polarizer 112 through the first optical fiber 113. The laser light is then linearly polarized to have the plane of polarization in the initial rotational position while the laser light passes through the polarizer 112. The polarized light passing through the polarizer 112 is then incident upon the one end portion of the magnetooptic effect element 120.

Within the magnetooptic effect element 120, the plane of polarization of the polarized light is rotated about the transmission path TP of the polarized light by the magnetooptic effect element 120 while the magnetooptic effect element 120 is uninfluenced by the applied magnetic field Ha and has the spontaneous magnetization substantially parallel with the transmission path of the polarized light. On the other hand, the plane of polarization of the polarized light is substantially maintained at the second rotational position identical to the initial rotational position of the polarized light while the magnetooptic effect element 120 is influenced by the applied magnetic field Ha and has the internal magnetization oriented in the direction substantially perpendicular to the transmission path TP of the polarized light. In other words, the plane of polarization of the polarized light is rotated due to the Faraday effect on condition that the polarized light passes through the magnetooptic effect element 120 in the direction substantially parallel with the spontaneous magnetization of the magnetooptic effect element 120.

It is therefore to be understood that the plane of polarization of the polarized light is rotated by the magnetooptic effect element 120 to assume the first rotational position $P_1$ and the polarized light is modulated into the first light component when the magnet 131 of the magnetic field applying means 130 is moved to a position remote from the magnetooptic effect element 120. When, on the other hand, the magnet 131 of the magnetic field applying means 130 is moved to a position adjacent to the magnetooptic effect element 120 enough to orient the internal magnetization of the magnetooptic effect element 120 in the direction substantially perpendicular to the transmission path TP of the polarized light, the rotational angle of the plane of polarization of the polarized light is reduced by the magnetooptic effect element 120 under the influence of the magnetic field Ha to shift from the first rotational position $P_1$ to the second rotational position $P_2$ and the polarized light is modulated into the second light component.

As a consequence, the polarized light is selectively modulated into the first and second light components by the magnetooptic effect element 120 in accordance with the presence and the absence of the applied magnetic field Ha, or, the position of the magnet 131 of the magnetic field applying means 130. Each of the modulated first and second light components is, then, incident upon the analyzer 141 of the optically analyzing means 140 and analyzed to select one from the first and second light components by the analyzer 141 of the optically analyzing means 140. In this case, only the second light component, which has the electric vector oriented the specific direction and including the plane of polarization assuming the second rotational position, is allowed to pass through the analyzer 141 of the optically analyzing means 140, since the disposition of the polarizer 112 and the analyzer 141 are held in the parallel Nicols state. The analyzed and selected one of the first and second light components is, then, guided by the second optical fiber 152 and transmitted to the photo diode 151 of the photo-electric converting means 150. The photo diode 151 converts the selected one of the first and second light components into the electric signal varied with the position of the magnet 131 of the magnetic field applying means 130. Thus, the position of the magnet 131, i.e., the position of the movable support unit is detected by the first embodiment of the position sensing apparatus.

An embodiment of the method according to the present invention which is applicable to the above-mentioned position sensing apparatus is carried out during the following steps.

Firstly, the polarized light producing means 110, the magnetooptic effect element 120 and the magnetic field applying means 130 are prepared.

Secondly, the magnetooptic effect element 120 is placed on the transmission path TP of the polarized light in such a manner that the spontaneous magnetization directions $M_1$, $M_2$ of the magnetic domains 121, 122 of the magnetooptic effect element 120 are substantially parallel with the transmission path TP of the polarized light.

The laser light emitted from the semiconductor laser 111 is then transmitted to the polarizer 112 through the first optical fiber 113 and linearly polarized. The plane of polarization of the polarized light which is incident upon each of the magnetic domains 121, 122 of the magnetooptic effect element 120 is rotated in a first rotational direction from the second rotational position $P_2$ to the first rotational position $P_1$ about the transmission path TP of the polarized light to assume the first rotational position $P_1$ while the polarized light passes through the magnetooptic effect element 120 in the absence of the applied magnetic field Ha. In this case, the magnet 131 of the magnetic field applying means 130 assumes the position remote from the magnetooptic effect element 120.

The magnet 131 of the magnetic field applying means 130 is then moved to the position adjacent to the magnetooptic effect element 120 and the magnetic field Ha is applied to the magnetooptic effect element 120 by the magnet 131 in a way that the internal magnetization of the magnetooptic effect element 120 is oriented in the direction substantially perpendicular to the transmission path TP of the polarized light. In this instance, the plane of polarization of the polarized light passing through each of the magnetic domains 121, 122 of the magnetooptic effect element 120 is rotated from the first rotational position $P_1$ in a second rotations/direction opposite to the first rotations/direction about the transmission path TP of the polarized light to assume the second rotations/position $P_2$ while the polarized light passes through the magnetooptic effect element 120 in the presence of the applied magnetic field Ha. In other words, the rotational angle of the plane of polarization of the polarized light is reduced in response to the intensity of the applied magnetic field Ha by the magnetooptic effect element 120.

If the magnet 131 of the magnetic field applying means 130 is moved to the position remote from the magnetooptic effect element 120 again and the applied magnetic field Ha is removed, the magnetooptic effect element 120 is spontaneously magnetized again by the quiescent maze pattern of magnetic domains 121, 122.

The magnet 131 of the magnetic field applying means 130 may assume the position adjacent to the magnetooptic effect element 120 when the magnetooptic effect element 120 is place on the transmission path TP of the polarized light.

At the second step, the polarized light incident upon the magnetooptic effect element 120 is selectively modulated into the first and second light components. Each of the first and second light components passing through the magnetooptic effect element 120 are, then, analyzed by the analyzer 141 of the optically analyzing means 140 to select one from the first and second light components. The optical signal varied with the position of the magnet 131 is constituted by the selected one of the first and second light components. At this stage, the magnetic field Ha may be intermittently applied to the magnetooptic effect element 120 to alternately produce a plurality of first light pulse components formed by the first light components and a plurality of second light pulse components formed by the second light components. In that case, the first and second light pulse components are analyzed by the analyzer 141 of the optically analyzing means 140 to selectively output the first and second light pulse components, and the optical signal is constituted only by the outputted light pulse components.

Thus, the first embodiment of the position sensing apparatus produces the optical signal varied with the position of the movable support unit under the condition that the transmission path TP of the polarized light is perpendicular to the direction of the magnetic field Ha applied to the magnetooptic effect element 120. Consequently, the optical transmission path TP of the position sensing apparatus according to the present invention can be flexibly directed, for example, directed in parallel with the movement direction of the magnetic scale and the like. This means the fact that the position sensing apparatus can be reduced in size in comparison with the prior-art position sensing apparatus in which the optical transmission path of the polarized light must be perpendicular to the movement direction of the magnetic scale and the like. In addition, the direction of the applied magnetic field Ha, the direction of the electric vector of the incident polarized light and the crystallization direction of the magnetooptic effect element 120 are determined to reduce the function of the magnetooptic effect element 120 to elliptically polarize the incident light for the Voigt effect, thereby making it possible to produce the optical signal in the highest sufficient S/N (signal-to-noise ratio).

Figure 4:
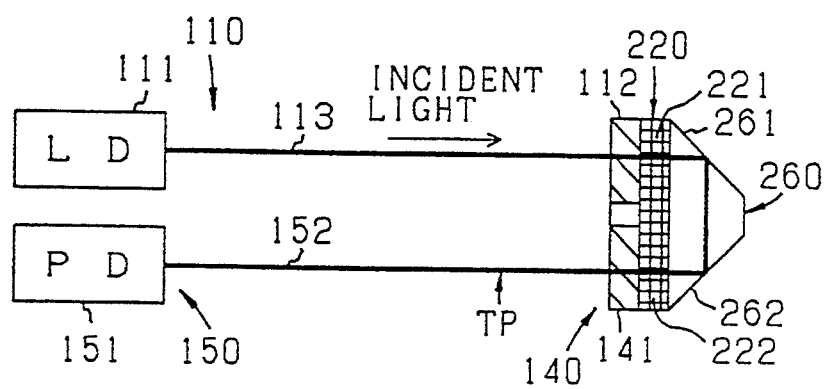
FIG. 4 is a plan view of a second embodiment of the position sensing apparatus according to the present invention.

Referring now to FIG. 4, there is shown a second embodiment of the position sensing apparatus according to the present invention. The members substantially identical to those of the first embodiment shown in FIG. 1 are simply designated by the like reference numerals and will be omitted in description for avoiding tedious repetition.

The position sensing apparatus shown in FIG. 4 comprises a magnetooptic effect element 220 having a pair of ferromagnet segments 221, 222 each made of a substantially transparent retromagnetic substance spontaneously magnetized and placed on the transmission path TP of the polarized light to have a spontaneous magnetization direction substantially parallel with the transmission path TP of the laser light emitted from the semiconductor laser 111. The polarizer 112 of the polarized light producing means 110 is held in tight contact with one end portion of the magnetooptic effect element 220 to linearly polarize the laser light emitted from the semiconductor laser 111. The substantially transparent ferromagnetic substance is identical to the ferromagnetic substance forming the magnetooptic effect element 120 of the first embodiment. The magnetooptic effect element 220 is designed to rotate the plane of polarization of the polarized light at a specific rotational angle, for example, at an angle of 45 degrees at each time when the polarized light passes therethrough.

Magnetic field applying means is not shown in FIG. 4 is adapted to apply a magnetic field Ha to the magnetooptic effect element 220 in the specific direction substantially perpendicular to the transmission path TP of the polarized light. The direction of the magnetic field Ha, the direction of the electric vector of the polarized light incident upon the magnetooptic effect element 220 and a crystallization direction of the magnetooptic effect element 220 are identical to those of the first embodiment. The magnetic field Ha applied to the magnetooptic effect element 220 in the specific direction causes the magnetooptic effect element 220 to orient internal magnetization in the specific direction substantially perpendicular to transmission path TP of the polarized light. The magnetic field applying means may include a pair of magnets facing to each other through the magnetooptic effect element 220.

The analyzer 141 of the optically analyzing means 140 is held in tight contact with one end of the magnetooptic effect element 220 in a way that the polarizer 112 and the analyzer 141 are held in parallel Nicols state for allowing only a polarized light having a specific electric vector to pass therethrough.

The position sensing apparatus further comprises a reflecting prism 260 forming a reflecting element and connected to the other end portion of the magnetooptic effect element 220. The reflecting prism 260 has a first reflecting face portion 261 which is adapted to reflect the polarized light passing through the magnetooptic effect element 220 at a right angle and a second reflecting face portion 262 which is adapted to reflect the polarized light reflected by the first reflecting portion 261 at a right angle. The polarized light reflected by the second reflecting face portion 262 passes through the magnetooptic effect element 220 again. This leads to the fact that the plane of polarization of the polarized light is rotated by the magnetooptic effect element 220 at a right angle between the polarizer 112 and the analyzer 141 to assume the first rotational position P₁ while the polarized light passes through the magnetooptic effect element 220 in the absence of the applied magnetic field Ha. Consequently, the plane of polarization of the polarized light assumes the different rotational positions consisting of the first rotational position in which the polarized light is modulated into the first light component and the second rotational position in which the polarized light is modulated into the second light component.

The aforesaid first optical fiber 113 and the polarizer 112 form as a whole a first optical wave transmitting unit for transmitting the light emitted from the semiconductor laser 111 to the other end portion of the magnetooptic effect element 220. The aforesaid analyzer 141 and the second optical fiber 252 form as a whole a second optical wave transmitting unit for transmitting the selected one of the first and second light components from the other end portion of the magnetooptic effect element 220 to the photo-electric converting means 150. The aforesaid reflecting prism 250 may be an U-shaped wave guiding element constituted by an optical fiber, a thin film waveguide or the like. Each of the aforesaid first and second reflecting face portions 261, 262 may be constituted by a metallic mirror or dielectric film mirror, while each of the first and second reflecting portions can be formed to attain, for example, total reflection by the reflecting surface of each of reflecting face portions between air and glass.

Thus, both of the first and second optical wave transmitting units are connected to the one end portion of the magnetooptic effect element 220, and the polarized light producing means 110 and the photo diode 151 forming the photo-electric converting means 150 are arranged to be adjacent to each other. This results in the fact that the second embodiment of the position sensing apparatus according to the present invention can be reduced in size.

Figure 5:
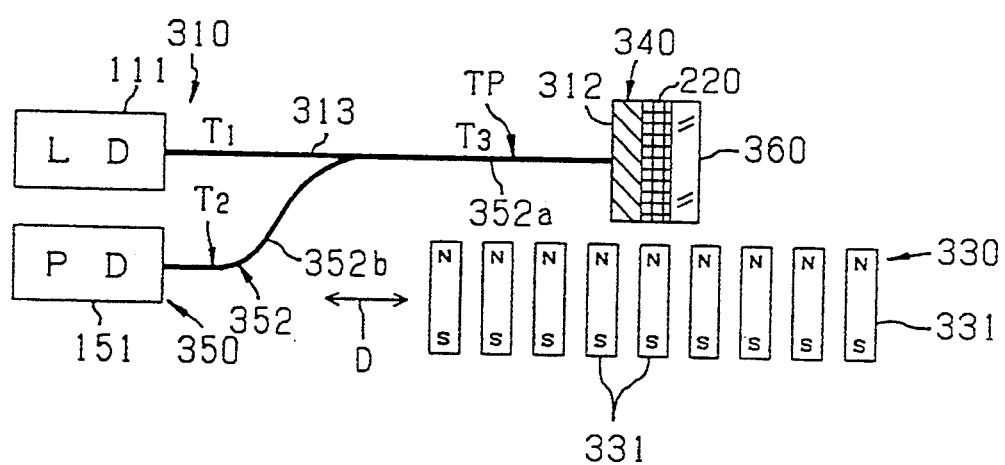
FIG. 5 is a plan view of a third embodiment of the position sensing apparatus according to the present invention.

Referring now to FIG. 5, there is shown a third embodiment of the position sensing apparatus according to the present invention. The members substantially identical to those of the above-mentioned embodiments shown in FIGS. 1 to 4 are simply designated by the like reference numerals and will be omitted in description for avoiding tedious repetition in a similar manner.

The position sensing apparatus shown in FIG. 5 comprises polarized light producing means 310 for producing polarized light linearly polarized on its transmission path TP, and a reflecting mirror 360 forming a reflecting element connected to one end portion of the magnetooptic effect element 220.

The polarized light producing means 310 is shown in FIG. 5 as comprising the semiconductor laser 111 and a polarizing element 312 held in tight contact with the magnetooptic effect element 220 and linearly polarizing the laser light emitted from the semiconductor laser 111. The polarized light producing means 310 further comprises a first optical fiber 313 connected at one end to the semiconductor laser 111 and at the other end to the magnetooptic effect element 220 for guiding the laser light emitted from the semiconductor laser 111 to the magnetic effect element 220. The first optical fiber 313 forms optical wave guiding means for guiding the light emitted from the light source along its optical transmission path $T_1$.

The reflecting mirror 360 is adapted to reflect the polarized light passing through the polarizer 312 toward the polarizer 312, so that the polarized light reflected by the reflecting mirror 360 passes through the magnetooptic effect element 220 again. As a result, the plane of polarization of the polarized light is rotated by the magnetooptic effect element 220 at a right angle while the polarized light repeatedly passes through the magnetooptic effect element 220 to assume the first rotational position while the polarized light repeatedly passes through the magnetooptic effect element 220 in the absence of the applied magnetic field Ha.

The position sensing apparatus also comprises a magnetic scale unit 330 movable in a movement direction D shown by an arrow D in FIG. 5 and forming magnetic field applying means which is adapted to apply a magnetic field Ha to the magnetooptic effect element 220 in the specific direction substantially perpendicular to the transmission path TP of the polarized light. More particularly, the magnetic scale unit 330 includes a plurality of magnets 331 selectively facing to the magnetooptic effect element 220 and each applying a magnetic field Ha to the magnetooptic effect element 220 to orient the internal magnetization of the magnetooptic effect element 220 in the direction substantially perpendicular to the transmission path TP of the polarized light. The magnetic field Ha applied to the magnetooptic effect element 220 in the specific direction causes the magnetooptic effect element 220 to orient the internal magnetization in the specific direction substantially perpendicular to transmission path TP of the polarized light. The rotational angle of the plane of polarization of the polarized light is minimized as a function of the magnetic field Ha applied to the magnetooptic effect element 220 by the magnetic scale unit 330. Consequently, the plane of polarization of the polarized light assumes the different rotational positions consisting of the first rotational position in which the polarized light is modulated into the first light component and the second rotational position in which the polarized light is modulated into the second light component.

The position sensing apparatus further comprises optically analyzing means 340 for analyzing the first and second light components to select one from the first and second light components and the photo diode 151 forming photo-electric converting means 350 for converting one of the first and second light components into an electric signal. The optically analyzing means 340 is shown in FIG. 5 as comprising the polarizing element 312 for allowing only a polarized light having a specific electric vector to pass therethrough. In other words, the polarizing element 312 of the polarized light producing means 310 and the analyzing element 312 of the optically analyzing means 340 constitute a single identical optical element 312 as the polarizing element. The photo-electric converting means 350 is shown in FIG. 5 as comprising the photo diode 151 for detecting the selected one of the first and second light components.

The position sensing apparatus further comprises a second optical fiber 352 connected at one end to the polarizer 312 and at the other end to the photo diode 151 for guiding the polarized light from the polarizer 312 to the photo diode 151 along its optical transmission path $T_2$. The second optical fiber 352 forming a second optical wave guiding element and partly has a common fiber portion 352a constituted by a part of the first optical fiber 313 and a branch portion 352b connected to the common fiber portion 352a through a fiber coupler not shown. The optical transmission paths $T_1$, $T_2$ formed by the first and second optical fibers 313, 352 partly share a unitary optical transmission path $T_3$ within the common potion 352a of the second optical fiber 352. The aforesaid first optical fiber 313 and the polarizing element 312 form as a whole a first optical wave transmitting unit for transmitting the polarized light from the polarized light producing means 310 to the other end portion of the magnetooptic effect element 220. The aforesaid polarizing element 312 and the second optical fiber 352 form as a whole a second optical wave transmitting unit for transmitting the selected one of the first and second light components from the other end portion of the magnetooptic effect element 220 to the photo-electric converting means 350.

Thus, as the first and second optical wave transmitting units are connected to the one end portion of the magnetooptic effect element 220, the polarized light producing means 310 and the photo-electric converting means 350 are arranged to be adjacent to each other. Further, the optical transmission paths $T_1$, $T_2$ formed by the first and second optical fibers 313, 352 partly share a unitary optical transmission path $T_3$, and the analyzing element is constituted by the polarizing element 312. Accordingly, the position sensing apparatus can be reduced in size and structurally simple. Furthermore, in the case of extension of the first and second optical fibers 313, 352, the long common portion 352a can be constituted by a part of the first optical fiber 313. This results in the fact that the cost of the position sensing apparatus is reduced.

Figure 6:
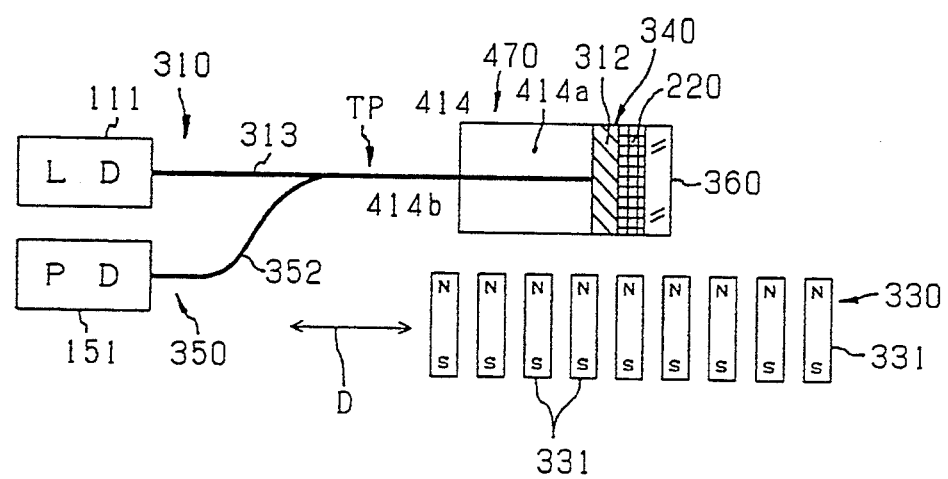
FIG. 6 is a plan view of a fourth embodiment of the position sensing apparatus according to the present invention.

Referring now to FIG. 6, there is shown a fourth embodiment of the position sensing apparatus according to the present invention. The members substantially identical to those of the above-mentioned embodiments shown in FIGS. 1 to 5 are simply designated by the like reference numerals and will be omitted in description for avoiding tedious repetition.

The position sensing apparatus shown in FIG. 6 comprises the polarized light producing means 310 including the semiconductor laser 111 forming the light source, the first optical fiber 313 and an optical wave guiding element 414 disposed between the first optical fiber 313 and the polarizing element 312. The optical wave guiding element 414 is produced by adopting the photolithography technique and has a substrate portion 414a connected to one end portion of the magnetooptic effect element 220 and a predetermined pattern of wave guiding element layer portion 414b lying on the substrate portion 414a. The wave guiding element layer portion 414b of the optical wave guiding element 414 can be produced to have a coupling portion of the optical transmission paths $T_1$, $T_2$ within the first and second optical fibers 313, 352.

The aforesaid first optical fiber 313 and the optical wave guiding element 414 constitute as a whole optical wave guiding means 470 for guiding the light emitted from the semiconductor laser 111 along the transmission path TP of the light and transmitting the light from the semiconductor laser 111 to the polarizing element 312.

The optical wave guiding element 414 is disposed between the fibers 313, 352 and the polarizing element 312, thereby making it possible to easily connect the fibers 313, 352 and the polarizing element 312 and to enhance reliability of the connection between the fibers 313, 352.

Figure 7:
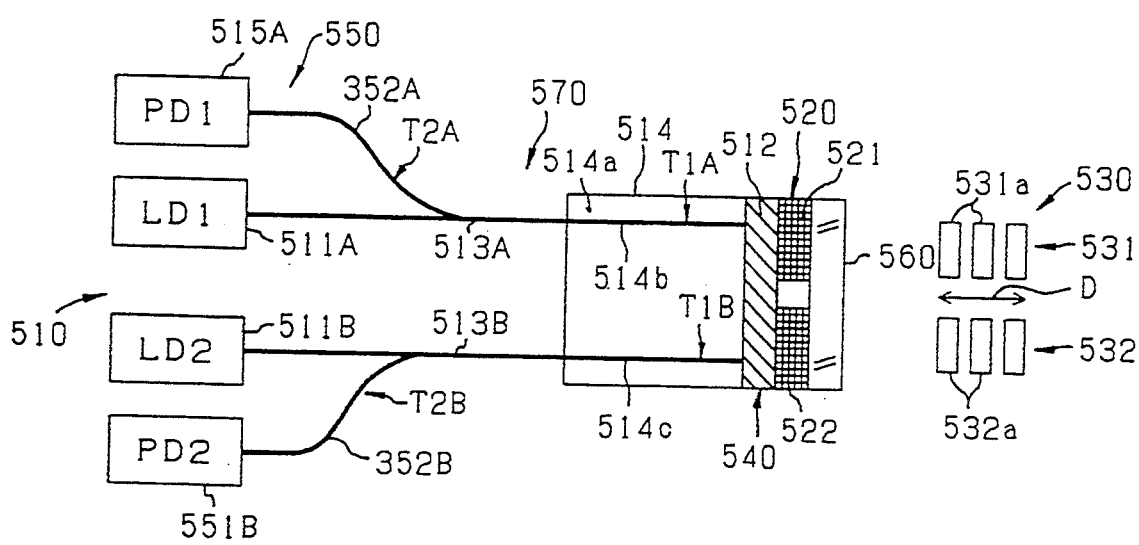
FIG. 7 is a plan view of a fifth embodiment of the position sensing apparatus according to the present invention.

Referring now to FIG. 7, there is shown a fifth embodiment of the position sensing apparatus according to the present invention. The members substantially identical to those of the above-mentioned embodiments shown in FIGS. 1 to 6 are designated by the like reference numerals for avoiding tedious repetition for the detailed description.

The position sensing apparatus utilizing magnetooptic modulation to perform multiplexing detection is shown in FIG. 7 as comprising polarized light producing means 510 for producing a plurality of polarized lights linearly polarized on their respective transmission paths T1A, T1B, a magnetooptic effect element 520 made of a ferromagnetic substance and spontaneously magnetized, and a magnetic field applying unit 530 having a plurality of magnetic scale members 531, 532.

The polarized light producing means 510 includes a plurality of, for example, a pair of semiconductor lasers 511A, 511B respectively producing laser lights on their respective transmission paths T1A, T1B and a polarizing element 512 adapted to linearly polarize the laser lights on the transmission paths T1A, T1B to have planes of polarization. The polarized light producing means 510 further comprises a pair of first optical fibers 513A, 513B and an optical wave guiding element 514. The first optical fibers 513A, 513B are respectively disposed between the semiconductor lasers 511A, 511B and the polarizing element 512 to guide the laser lights respectively emitted from the semiconductor lasers 511A, 511B along their respective transmission paths T1A, T1B. The optical wave guiding element 514 is disposed between the first optical fibers 513A, 513B and the polarizing element 512 and has a substrate portion 514a connected to the polarizing element 512 and two waveguide layer portions 514b, 514c lying on the substrate portion 514a. As stated above, the plane of polarization of each of the linearly polarized laser lights is rotatable about the transmission path T1A or T1B to assume the two different rotational positions consisting of the first rotational position in which the polarized light is modulated into the first light component and the second rotational position in which the polarized light is modulated into the second light component.

The magnetooptic effect element 520 has a plurality of, for example, a pair of ferromagnet segments 521, 522 each made of a ferromagnetic substance spontaneously magnetized to have a spontaneous magnetization direction substantially parallel with each of the transmission paths T1A, T1B of the polarized lights. Each of the ferromagnet segments 521, 522 of the magnetooptic effect element 520 is identical to the magnetooptic effect element 220 of the fourth embodiment and the ferromagnet segments 521, 522 are respectively placed in parallel on the transmission paths T1A, T1B. The plane of polarization of each of the polarized lights is rotated at a specific rotational angle about each of the transmission paths T1A, T1B to assume the first rotational position $P_1$ while each of the polarized lights passes through the magnetooptic effect element 520. The polarized light on each of the transmission paths T1A, T1B is modulated into the first light component when the plane of polarization of the polarized light assumes the first rotational position $P_1$.

The magnetic field applying unit 530 has a plurality of magnetic scale members 531, 532 corresponding to the transmission paths T1A, T1B of the polarized lights and respectively including a plurality of magnets 531a, 532a. The magnetic scale members 531, 532 are juxtaposed in the direction perpendicular to the transmission paths T1A, T1B of the polarized lights and respectively facing the ferromagnet segments 521, 522 of the magnetooptic effect element 520. Each of the magnetic scale members 531, 532 is adapted to apply a magnetic field Ha (not shown in FIG. 7) to each of the ferromagnet segments 521, 522 of the magnetooptic effect element 520 to orient internal magnetization of each of the ferromagnet segments 521, 522 in the direction substantially perpendicular to the transmission paths T1A, T1B.

The magnets 531a, 532a of the magnetic scale members 531, 532 are respectively arranged in spaced-apart relationship at a plurality of different positions on a movable scale body not shown in FIG. 7 in parallel with a movement direction of the scale body. The movement direction D of the magnetic field applying unit 530 is determined to be parallel with each of the transmission paths T1A, T1B. Thus, the aforesaid magnetic field applying unit 530 is movable with respect to the magnetooptic effect element 520 in the movement direction D. When the magnets 531a, 532a are respectively remote form the magnetic segments 521, 522 of the magnetooptic effect element 520, each of the planes of polarization of the polarized lights is rotated at an angle of 45 degrees by the magnetooptic effect element 520 while each of the polarized lights passes through the magnetooptic effect element 520.

The position sensing apparatus further comprises a reflecting mirror 560 which is adapted to reflect the polarized lights passing through the ferromagnet segments 521, 522 of the magnetooptic effect element 520 on the transmission paths T1A, T1B, so that the polarized lights reflected by the reflecting mirror 560 respectively pass through the ferromagnet segments 521, 522 of the magnetooptic effect element 520 again. This leads to the fact that the plane of polarization of the polarized light on each of the transmission paths T1A, T1B is rotated by the magnetooptic effect element 520 at a right angle to assume the first rotational position while each of the polarized lights passes through the magnetooptic effect element 520 repeatedly in the absence of the applied magnetic field Ha. The polarized lights on the transmission paths T1A, T1B are respectively modulated into the second light components when the planes of polarization of the polarized lights assume the second rotational position.

The position sensing apparatus shown in FIG. 7 further comprises optically analyzing means 540 constituted by the polarizing element 512 for analyzing the first and second light components on the transmission paths T1A, T1B respectively passing through the ferromagnet segments 521, 522 of the magnetooptic effect element 520 to selectively output the first and second light components on their transmission paths T2A, T2B. The outputted one of the first and second light components on each of the transmission paths T2A, T2B constitutes each of the optical signals used for the multiplexing detection.

The position sensing apparatus further comprises the photo diodes 515A, 515B forming photo-electric converting means and respectively converting one of the first and second light components on the transmission paths T2A, T2B into electric signals varied with the position of the movable support unit. The aforesaid first optical fibers 513A, 513B and the optical wave guiding element 514 constitute as a whole optical wave guiding means 570 for guiding the lights respectively emitted from the semiconductor lasers 511A, 511B along their respective transmission paths T$_1$, T$_2$ and transmitting the lights from the semiconductor lasers 511a, 511B to the polarizer 512.

When the magnetic scale members 531, 532 are moved in the movement direction D with the movable scale body, each of the magnets 531a, 532a of the magnetic scale members 531, 532 are moved toward and away from the ferromagnet segments 521, 522 of the magnetooptic effect element 520. In this instance, the planes of polarization of the polarized lights on the transmission paths T1A, T1B are selectively rotated at a right angle in response to the movement of the movable scale body while the polarized lights repeatedly pass through the magnetooptic effect element 520. The polarized lights repeatedly passing through the magnetooptic effect element 520 are, then, incident upon the polarizing element 512 and the first and second light components of the polarized lights on the transmission paths T1A, T1B are selectively outputted by the polarizing element 512, respectively, in accordance with the arrangement of the magnets 531a, 532a of the magnetic scale members 531, 532. That is, the optical signals constituted by the outputted light components are varied with the .position of the movable scale body and outputted to the photo diodes 551A, 551B. As the magnets 531a, 532a of the magnetic scale members 531, 532 are respectively arranged on the movable scale body at the different positions in the movement direction, there is a difference in timing between the optical signals respectively outputted from the polarizing element 512.

Accordingly, the movement direction can be discriminated on the basis of timing of the optical signals.

Figure 8:
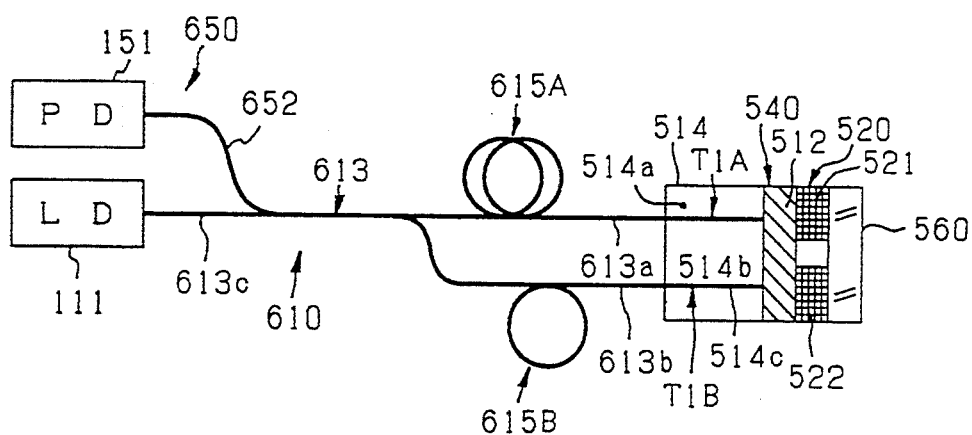
FIG. 8 is a plan view of a sixth embodiment of the position sensing apparatus according to the present invention.

Referring now to FIG. 8, there is shown a sixth embodiment of the position sensing apparatus according to the present invention. The members substantially identical to those of the above-mentioned embodiments shown in FIGS. 1 to 7 are simply designated by the like reference numerals for avoiding tedious repetition for the detailed description.

The position sensing apparatus utilizing magnetooptic modulation to perform multiplexing detection is shown in FIG. 8 as comprising polarized light producing means 610 for producing a plurality of polarized lights linearly polarized on their respective transmission paths T1A, T1B. The polarized light producing means 610 includes the semiconductor laser 111, the polarizing element 512 and a distributing fiber unit 613 having a pair of output portions 613a, 613b and an input portion 613c connected to the semiconductor laser 111 and distributing the laser light emitted from the semiconductor laser 111 to the output portions 613a, 613b. The optical wave guiding element 514 is disposed between the distributing fiber unit 613 and the polarizing element 512 and having a pair of waveguide potions 514b, 514c respectively connected to the output portions 613a, 613b of the distributing fiber unit 613.

The position sensing apparatus shown in FIG. 8 further comprises an additional optical fiber 652 coupled with the distributing fiber unit 613 and forming part of second optical wave guiding means disposed between the photo diode 151 and the polarizing element 512. The position sensing apparatus further comprises a pair of optical delay elements, for example, optical delay fiber coils 615A, 615B disposed between the input portion 613c of the distributing fiber unit 613 and the output portions 613a, 613b of the distributing fiber unit 613 and making a difference in the necessary time for transmission, i.e., a predetermined delay time between the lights on the transmission paths T1A, T1B.

The first and second light components on each of the transmission paths T1A, T1B respectively passing through the magnetooptic effect element 520 repeatedly are analyzed and selectively outputted to form a plurality of optics/signals on the transmission paths T1A, T1B. In this instance, as the optical delay fiber coils 615A, 615B are disposed on the transmission paths T1A, T1B, there is a difference in timing between the lights on the transmission paths T1A, T1B and the difference in timing between the optical signals outputted from the polarizing element 512 is increased while the optical signals respectively pass through the optical delay fiber coils 615A, 615B again. The optical signals respectively passing through the optical delay fiber coils 615A, 615B are optically mixed and multiplexed by the distributing fiber unit 613 so that the optical signals are formed into a plurality of multiplexed light pulses respectively varied with the position of the movable scale body. The multiplexed light pulses are transmitted to photo diode 151 through the additional optical fiber 652 to convert the multiplexed light pulses into a plurality of electric signals by which the position of the movable scale body and the direction of the movement of the movable scale body are detected. Thus, the optical signals on the transmission paths T1A, T1B are used for time division multiplexing detection.

Figure 9:
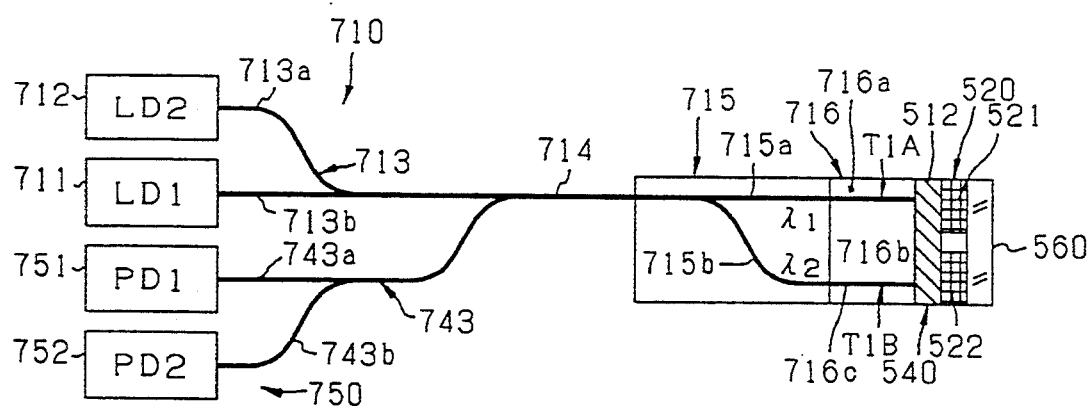
FIG. 9 is a plan view of a seventh embodiment of the position sensing apparatus according to the present invention.

Referring now to FIG. 9, there is shown a seventh embodiment of the position sensing apparatus according to the present invention. The members substantially identical to those of the above-mentioned embodiments shown in FIGS. 1 to 8 are simply designated by the like reference numerals and will be omitted in description for avoiding tedious repetition.

The position sensing apparatus shown in FIG. 9 comprises polarized light producing means 710 for producing a plurality of polarized lights linearly polarized on their respective transmission paths T1A, T1B, and photo-electric converting means 750 for converting the optical signals analyzed by the polarizer 512 into a plurality of electric signals.

The polarized light producing means 710 includes a plurality of, for example, a pair of semiconductor lasers 711, 712 forming light sources which are adapted to emit a plurality of lights respectively having different wavelengths on their respective transmission paths T1A, T1B. The polarized light producing means 710 further includes a wavelength multiplexing fiber unit 713 having a pair of input portions 713a, 713b respectively connected to the semiconductor lasers 711, 712, an optical waveguide 716 having a pair of wave guiding portions 716a, 761b and connected to the polarizing element 512, and a wavelength demultiplexing element 715 having a pair of output portions 715a, 715b respectively connected to the wave guiding portions 716a, 716b of the optical waveguide 716. The polarized light producing means 710 further includes a common path fiber 714 disposed between the wavelength multiplexing fiber unit 713 and the wavelength demultiplexing element 715.

The photo-electric converting means 750 includes a plurality of, for example, a pair of photo diodes 751, 752 respectively receiving the optical signals outputted from the polarizing element 512 to convert the optical signals to the electric signals, and a distributing fiber unit 743 having a pair of output portions 743a, 743b respectively connected to the photo diodes 751, 752. The photo diodes 751, 752 have different spectral sensitivities since the optical signals respectively have different wavelength. The distributing fiber unit 743 may be an wavelength demultiplexer.

The laser lights respectively emitted from the semiconductor lasers 711, 712 are multiplexed by the wavelength multiplexing fiber unit 713 and transmitted-to the wavelength demultiplexing element 715 to be demultiplexed. The laser lights passing through the wavelength demultiplexing element 715 are respectively guided by the optical wave guide 716 to be incident upon the polarizing element 512. The laser lights are linearly polarized by the polarizing element 512 and the planes of polarization of the linearly polarized light are selectively rotated by the magnetooptic effect element 520 to modulate each of the polarized lights into the first and second light components. The modulated light components are analyzed by the polarizing element 512 to form into a plurality of optical signals varied with the position of the movable scale body. The optical signals are multiplexed by the wavelength demultiplexing element 715 and transmitted to the photo diodes 751, 752 through the common path fiber 714 and the distributing fiber unit 743 to form the optical signals into the electric signals by which the position of the movable scale body and the direction of the movement of the movable scale body are detected. Thus, the optical signals each having different wavelength are used for wavelength multiplexing detection and the position sensing apparatus performs wavelength multiplexing detection.

The position sensing apparatus is not only for performing the wavelength multiplexing detection but also for performing the time division multiplexing detection in the case that the optical delay element is disposed on, for example, one of the transmission paths T1A, T1B of the position sensing apparatus.

Referring now to FIGS. 10 to 13, there is shown an eighth embodiment of the position sensing apparatus according to the present invention. The members substantially identical to those of the above-mentioned embodiment shown in FIGS. 1 to 9 are simply designated by the like reference numerals and will be omitted in description for avoiding tedious repetition.

Figure 10:
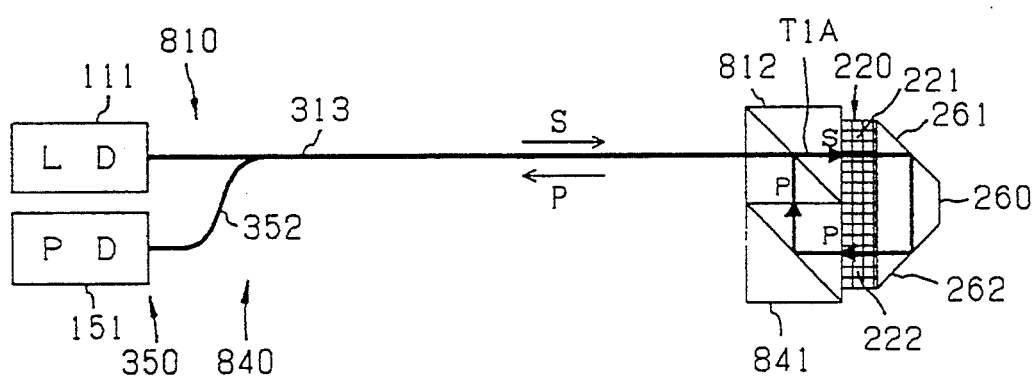
FIG. 10 is a plan view of an eighth embodiment of the position sensing apparatus according to the present invention.

The position sensing apparatus shown in FIG. 10 comprises polarized light producing means 810 and optically analyzing means 840. The polarized light producing means 810 includes the semiconductor laser 111, the first optical fiber 313, a first polarization beam splitter 812 connected to the magnetooptic effect element 220 and a second polarization beam splitter 841 connected to the magnetooptic effect element 220. Each of the first and second polarization beam splitters 812, 841 is adapted not only to allow one of s-polarized and p-polarized light components, for example, the s-polarized light component to pass therethrough but also to reflect the other of the s-polarized and p-polarized light components, for example, the p-polarized light component. The laser light emitted from the semiconductor laser 111 includes the s-polarized light component and the p-polarized light component.

The optically analyzing means 840 also includes the first polarization beam splitter 812 and the second polarization beam splitter 841. The laser light emitted from the semiconductor laser 111 is linearly polarized and divided into s-polarized and p-polarized light components by the first polarization beam splitter 812. The s-polarized and p-polarized light components are respectively transmitted through the magnetooptic effect element 220 in parallel with each other and oppositely reflected twice by the reflected prism 260 so as to be incident upon the magnetooptic effect element 220 again.

Figure 11:
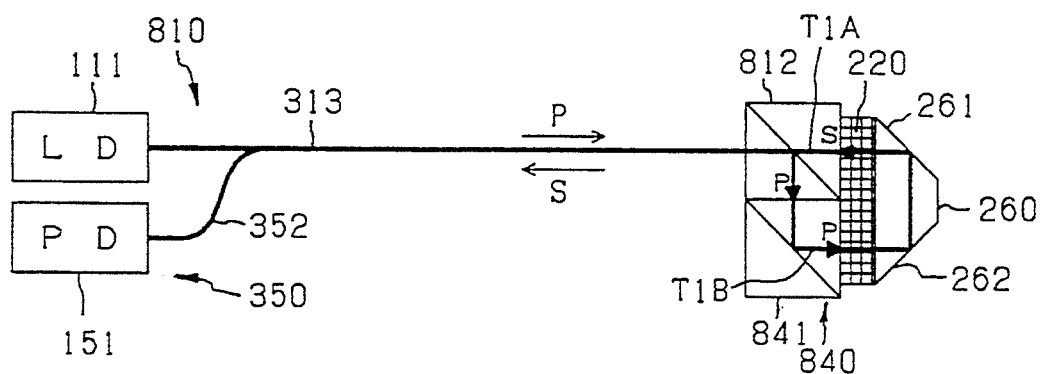
FIGS. 11 to 13 are plan views similar to FIG. 10 illustrating the optical transmission path of the eighth embodiment of the position sensing apparatus according to the present invention.

The planes of polarization of the s-polarized and p-polarized light components, i.e., the polarized lights are respectively rotated by the magnetooptic effect element 220 at a right angle between the first and second polarization beam splitters 812, 841 in the absence of the magnetic field Ha applied to the magnetooptic effect element 220 by the magnetic field applying means 130. Consequently, at the time when the magnetooptic effect element 220 is spontaneously magnetized in the absence of the applied magnetic field Ha, the s-polarized light component is modulated into the p-polarized light component while the polarized light component passes through the magnetooptic effect element 220 and the reflecting prism 260 as shown in FIG. 10. On the other hand, the p-polarized light component is modulated into the s-polarized light component while the polarized light component passes through the magnetooptic effect element 220 and the reflecting prism 260 as shown in FIG. 11. At this time, both of the s-polarized and p-polarized light component are reflected by the first and second polarization beam splitters 812, 841 and received by the photo diode 151, thereby making it possible to prevent amount of the polarized light received by the photo diode 151 from decreasing.

Figure 12:
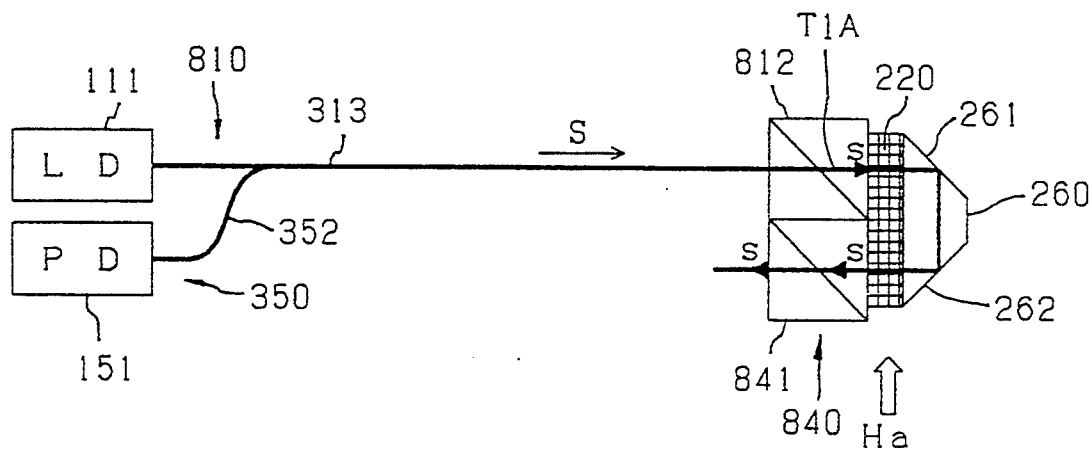
Figure 13:
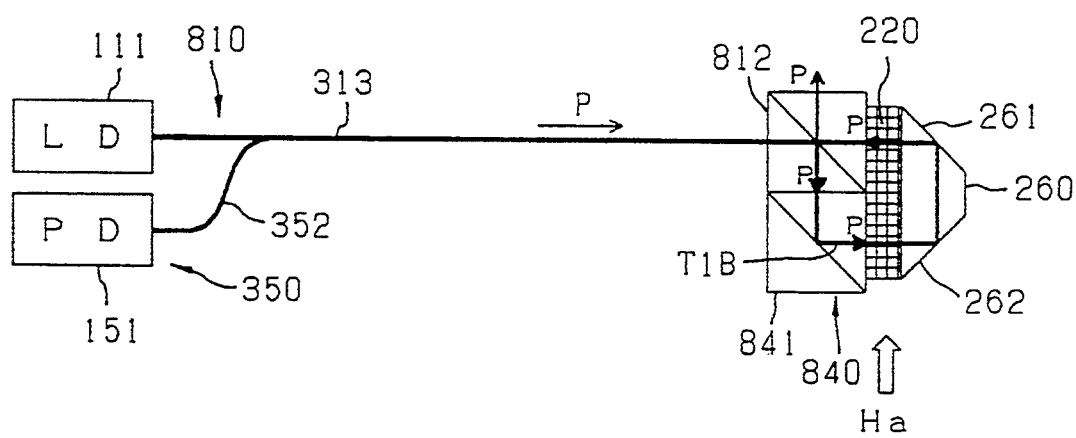

At the time when the magnetic field Ha is applied the magnetooptic effect element 220 by the magnetic field applying means 130, the s-polarized light component is transmitted through the magnetooptic effect element 220 and the reflecting prism 260 as shown in FIG. 12 and passes through the second polarization beam splitter 841, while the p-polarized light component is transmitted through the magnetooptic effect element 220 and the reflecting prism 260 as shown in FIG. 11 and passes through the first polarization beam splitter 812. At this time, the photo diode 151 receives none of the polarized light components.

Figure 14:
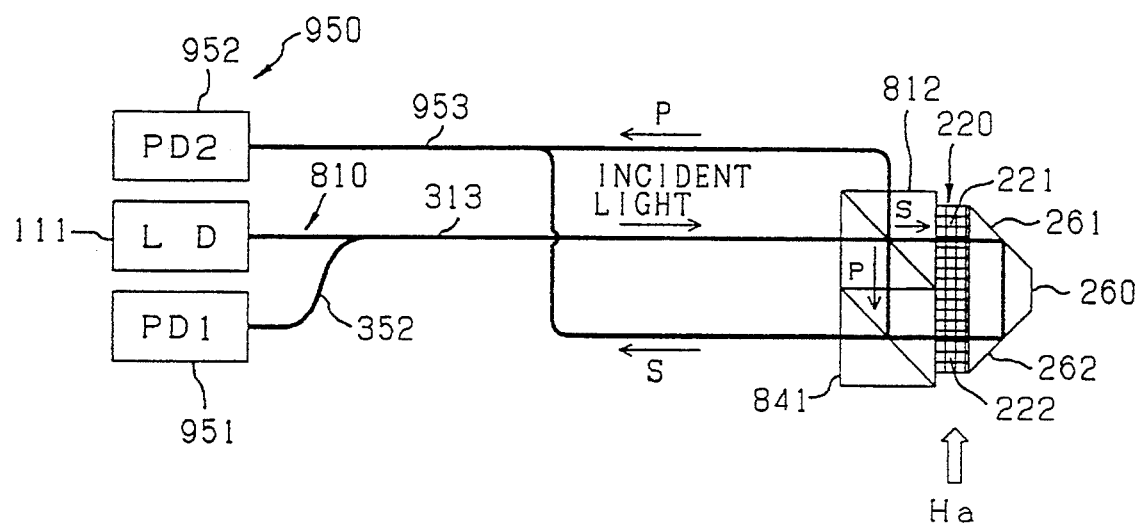
FIG. 14 is a plan view of a ninth embodiment of the position sensing apparatus according to the present invention.

Referring now to FIG. 14, there is shown a ninth embodiment of the position sensing apparatus according to the present invention. The members substantially identical to those of the above-mentioned embodiments shown in FIGS. 1 to 13 are designated by the like reference numerals for avoiding tedious repetition for the detailed description.

The position sensing apparatus shown in FIG. 14 comprises photo-electric converting means 950 including the first and second photo diodes 951, 952 and an optically mixing fiber unit 953 disposed between the first and second polarization beam splitters 812, 841 and the second photo diode 952. Each of the first and second photo diodes 951, 952 of the photo-electric converting means 950 is identical to the photo diode 151. The optically mixing fiber unit 953 has a pair of input portions respectively connected to the first and second polarization beam splitters 812, 841 and an output portion connected to the second photo diode 952.

At the time when the magnetooptic effect element 220 is spontaneously magnetized in the absence of the applied magnetic field Ha, the s-polarized light component is modulated into the p-polarized light component while the polarized light component passes through the magnetooptic effect element 220 and the reflecting prism 260. On the other hand, the p-polarized light component is modulated into the s-polarized light component while the polarized light component passes through the magnetooptic effect element 220 and the reflecting prism 260. At this time, the first photo diode 951 receives both of the polarized light components respectively reflected by the first and second polarization beam splitters 812, 841, while the second photo diode 952 receives none of the polarized light components.

At the time when the magnetic field Ha is applied the magnetooptic effect element 220 by the magnetic field applying means 130, the s-polarized light component is transmitted to the second photo diode 952 through the magnetooptic effect element 220, the reflecting prism 260, the second polarization beam splitter 841 and the optically mixing fiber unit 953, while the p-polarized light component is also transmitted to the second photo diode 952 through the magnetooptic effect element 220, the reflecting prism 260, the first polarization beam splitter 812 and the optically mixing fiber unit 953. At this time, the second photo diode 952 receives both of the polarized light components respectively passing through the first and second polarization beam splitters 812, 841, while the first photo diode 951 receives none of the polarized light components.

Accordingly, the output signals of the first and second photo diodes 951, 952 can be used for the optical heterodyne detection to cancel undesirable noises of the semiconductor laser and the like and to sufficiently increase the S/N (signal-to-noise ratio) value.

Figure 15:
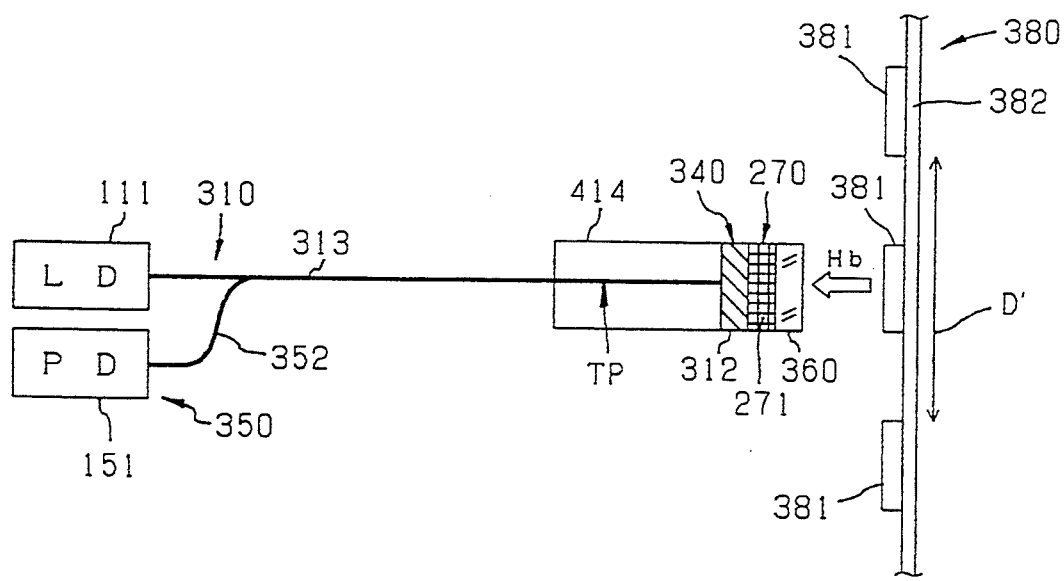
FIG. 15 is a plan view of a tenth embodiment of the position sensing apparatus according to the present invention.

Referring now to FIG. 15, there is shown a tenth embodiment of the position sensing apparatus according to the present invention. The members substantially identical to those of the above-mentioned embodiments shown in FIGS. 1 to 14 are designated by the like reference numerals for avoiding tedious repetition for the detailed description.

Figure 16A:
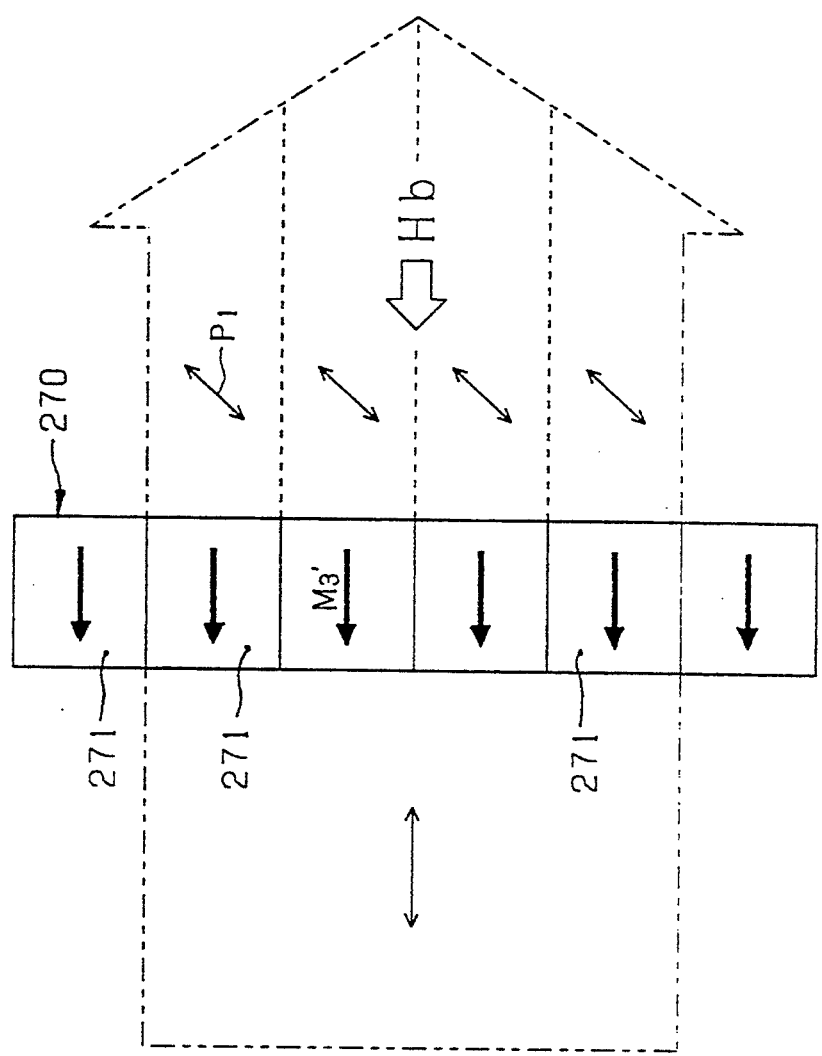

The position sensing apparatus shown in FIG. 15 comprises a magnetooptic effect element 270 disposed between the polarizing element 312 and the reflecting mirror 360. The magnetooptic effect element 270 is placed on the transmission path TP of the polarized light to have a spontaneous magnetization direction substantially perpendicular to the transmission path TP of the polarized light. More particularly, the magnetooptic effect element 270 is made of a substantially transparent ferromagnetic substance such as a magnetic single-crystal iron-garnet to be magnetically "soft". The ferromagnetic substance forming the magnetooptic effect element 270 is shown in FIG. 16b as having an assemblage of spontaneously magnetized regions, i.e., magnetic domains 271 spontaneously magnetized to have a spontaneous magnetization direction shown by a plurality of arrows $M_1'$ substantially perpendicular to the transmission path TP of the polarized light. The spontaneous magnetization direction of the magnetooptic effect element 270, the direction of the electric vector of the incident polarized light and a crystallization direction of the magnetooptic effect element 270 are so determined as to reduce the function of the magnetooptic effect element 270 to elliptically polarize the incident light for the Voigt effect and to rotate the major axis of the elliptically polarized light for the Voigt effect. For simplicity, each of the schematic representation of FIGS. 16a and 16b shows only six magnetic domains 271. As shown in FIG. 16b, the rotational angle of the plane of polarization of the polarized light is reduced by the magnetooptic effect element 270 in the absence of the applied magnetic field Hb to allow the plane of polarization of the polarized light to assume the second rotational position in which the polarized light is modulated into the second light component.

Turning back to FIG. 15, the position sensing apparatus further comprises a movable magnetic scale unit 380 forming magnetic field applying means which is adapted to apply a magnetic field Hb to the magnetooptic effect element 270 in the direction substantially parallel to the transmission path TP of the polarized light. More particularly, the magnetic scale unit 380 includes a plurality of magnets 381 selectively facing to the magnetooptic effect element 270 and each applying a magnetic field Hb to the magnetooptic effect element 270 to orient the internal magnetization of the magnetooptic effect element 270 in the direction $M_3'$ shown by an arrow $M_3'$ in FIG. 16b substantially parallel with the transmission path TP of the polarized light. The magnetic field Hb applied to the magnetooptic effect element 270 in the specific direction causes the magnetooptic effect element 270 to orient the internal magnetization in the specific direction substantially parallel with the transmission path TP of the polarized light. The plane of polarization of the polarized light is rotated about the transmission path TP of the polarized light by the magnetooptic effect element 270 in the presence of the applied magnetic field Hb to assume the first rotational position in which the polarized light is modulated into the first light component. More particularly, as shown in FIG. 16a, each of the magnetic domains 271 of the magnetooptic effect element 270 causes the Faraday rotation at the specific rotational angle, for example, at an angle of 45 degrees in the presence of the applied magnetic field Hb.

Thus, the polarized light is modulated into the first light component when the plane of polarization is rotated to the first rotational position $P_1$ under the influence of the applied magnetic field Hb, while the polarized light is modulated into the second light component when the plane of polarization is maintained to the second rotational position $P_2$ under the influence of the spontaneous magnetization of the magnetooptic effect element 270.

An embodiment of the method according to the present invention which is applicable to the above-mentioned position sensing apparatus is carried out during the following steps.

Firstly, the polarized light producing means 310, the magnetooptic effect element 270 and the magnetic scale unit 380 forming the magnetic field applying means are prepared.

Secondly, the magnetooptic effect element 270 is placed on the transmission path TP of the polarized light in such a manner that the spontaneous magnetization direction of the magnetooptic effect element 270 is substantially perpendicular to with the transmission path TP of the polarized light.

The magnetic field Hb is then applied to the magnetooptic effect element 270 with the internal magnetization of the magnetooptic effect element 270 being oriented in a direction substantially parallel with the transmission path TP of the polarized light. In this case, one of the magnets 381 of the magnetic field applying means 380 assumes the position adjacent to the magnetooptic effect element 270. On the other hand, the laser light emitted from the semiconductor laser 111 is transmitted to the polarizing element 312 through the first optical fiber 313 and linearly polarized, so that the plane of polarization of the polarized light is rotated in the first rotational direction about the transmission path TP of the polarized light to assume the first rotational position $P_1$ while the polarized light passes through the magnetooptic effect element 270.

The applied magnetic field Hb is then removed from the magnetooptic effect element 270 on the transmission path TP of the polarized light, so that the plane of polarization of the polarized light is maintained by the magnetooptic effect element 270 to assume the second rotational position $P_2$ while the polarized light passes through the magnetooptic effect element 270. In this case, the magnets 381 of the magnetic field applying means 380 assume the positions remote from the magnetooptic effect element 270. At this time, the magnetooptic effect element 270 is spontaneously magnetized again by the quiescent magnetic domains 271.

Each of the magnets 381 of the magnetic scale unit 380 may assume the position remote from the magnetooptic effect element 270 when the magnetooptic effect element 270 is placed on the transmission path TP of the polarized light.

At the second step, the polarized light is selectively modulated into the first and second light components by the magnetooptic effect element 270. Each of the first and second light components passing through the magnetooptic effect element 270 is then analyzed by the polarizing element 312 to select one from the first and second light components. The optical signal varied with the position of the magnetic scale unit 380 is constituted by the selected one of the first and second light components. At this stage, the magnetic field Hb may be intermittently applied to the magnetooptic effect element 270 to alternately produce a plurality of first light pulse components formed by the first light components and a plurality of second light pulse components formed by the second light components. In that case, the first and second light pulse components are analyzed by the polarizing element 312 to selectively output the first and second light pulse components, and the optical signal is constituted by the outputted light pulse components.

Thus, the position sensing apparatus produces the optical signals varied with the position of the movable magnetic scale unit 380 under the condition that the transmission path TP of the polarized light is substantially perpendicular to the spontaneous magnetization direction of the magnetooptic effect element 270. As aforementioned, the direction of the applied magnetic field Hb, the direction of the electric vector of the incident polarized light and the crystallization direction of the magnetooptic effect element 270 are determined to reduce the function of the magnetooptic effect element 270 to elliptically polarize the incident light for the Voigt effect, thereby making it possible to produce the optical signal in the highest sufficient S/N (signal-to-noise ratio).

Figure 17:
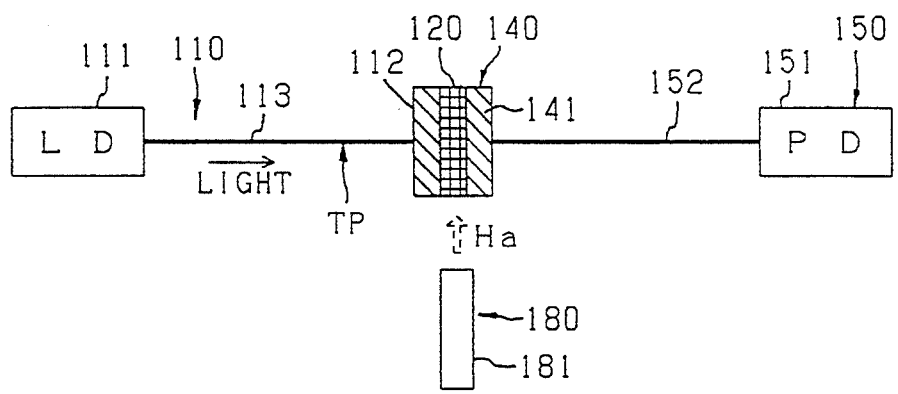
FIG. 17 is a plan view of a first embodiment of the optical switch according to the present invention.

Referring now to FIG. 17, there is shown a first embodiment of the optical switch according to the present invention. The members substantially identical to those of the first embodiment of the position sensing apparatus shown in FIG. 1 are designated by the like reference numerals for avoiding tedious repetition for the detailed description.

The optical switch shown in FIG. 17 comprises a magnetic field applying unit 150 including a magnetic coil 181. The magnetic coil 181 is adapted to apply the magnetic field Ha to the magnetooptic effect element 120 in the direction substantially perpendicular to the transmission path of the polarized light.

The magnetooptic effect element 120 is disposed on the transmission path TP to make and break an optical transmission line constituted by the semiconductor laser 111, the first and second optical fibers 113, 152, the polarizer 112, the magnetooptic effect element 120 and the photo diode 151.

At the time when the magnetic field Ha is applied to the magnetooptic effect element 120 by the magnetic coil 181 of the magnetic field applying means 180, the plane of polarization of the polarized light is shifted to the second rotational position from the first rotational position by the magnetooptic effect element 120 while the polarized light passes through the magnetooptic effect element 120 in the presence of the applied magnetic field Ha. At this time, the polarized light is modulated into the first light component. On the other hand, at the time when the magnetooptic effect element 120 is spontaneously magnetized in the absence of the magnetic field Ha, the plane of polarization of the polarized light is shifted to the first rotational position from the second rotational position by the magnetooptic effect element 120 while the polarized light passes through the magnetooptic effect element 120 in the absence of the applied magnetic field Ha. At this time, the polarized light is modulated into the second light component. Consequently, the first and second light components are respectively analyzed by the polarizing element 312 to selected one from the first and second light components.

The optical switch is "on" when one of the first and second light components is allowed to pass through the polarizer 112 and received by the photo diode 151, while the optical switch is "off" when the other of the first and second light components is cut off by the polarizer 112.

Thus, the optical switch is operated by the magnetic coil 181 of the magnetic field applying means 180 to make and break the optical transmission line between the two optical units. The optical switch can be reduced in size and perform reliable optically switching. Further, the intensity of the magnetic field can be controlled to various intensity values by the magnet coils to modulate the light into various light components respectively having the different rotational angles of the plane of polarization. In that case, the rotational angle of the plane of polarization is varied with the intensity of the magnetic field, thereby making it possible to detect the intensity of the applied magnetic field.

The sensor head of the tenth embodiment of the position sensing apparatus is also applicable to an optical switch on condition that the movable magnetic scale unit 380 is replaced by the magnetic coil 181 of the magnetic field applying means 180.

Figure 18:
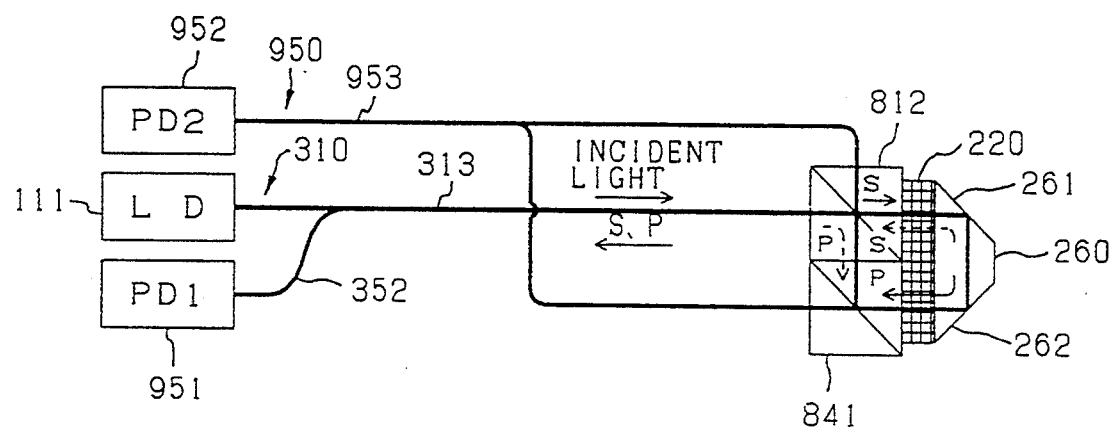
FIG. 18 is a plan view of a second embodiment of the optical switch according to the present invention.
Figure 19:
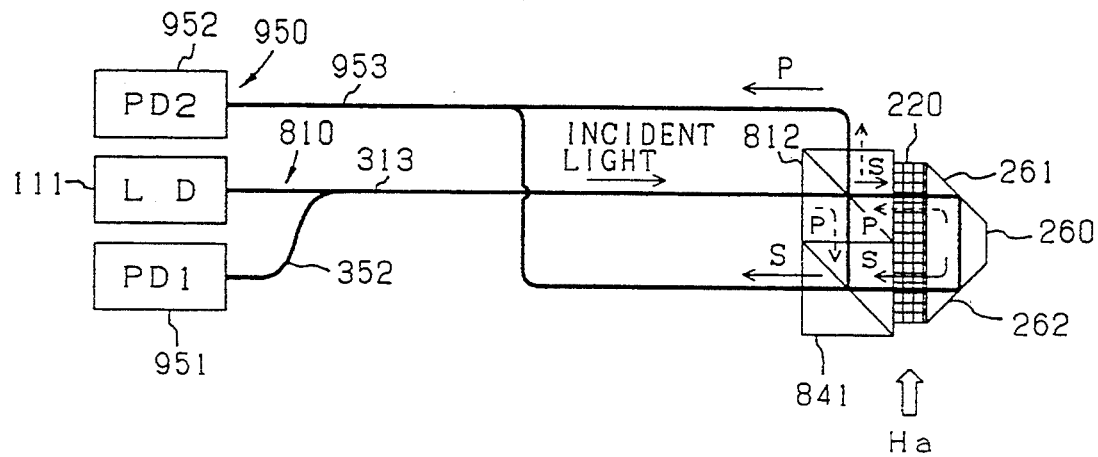
FIG. 19 is a view similar to FIG. 18 and illustrating the optical transmission path of the second embodiment of the optical switch according to the present invention.

Referring now to FIGS. 18 and 19, there is shown a second embodiment of the optical switch according to the present invention. The members substantially identical to the those of the ninth embodiment of the position sensing apparatus shown in FIGS. 14 are designated by the like reference numerals for avoiding tedious repetition for the detailed description.

The optical switch shown in FIG. 18 comprises a magnetic field applying unit (not shown) including a magnetic coil. The magnetic coil is adapted to apply a magnetic field to the magnetooptic effect element 220 in the direction substantially perpendicular to the transmission path of the polarized light.

The magnetooptic effect element 220 is disposed on the transmission paths T1A, T1B to make and break a pair of optical transmission lines constituted by the semiconductor laser 111, the first and second optical fibers 313, 352, the first and second polarization beam splitters 812, 841, the magnetooptic effect element 220, the reflecting prism 260 and the photo diodes 951, 952.

The incident light emitted from the semiconductor laser 111 is divided into the s-polarized and p-polarized light components by the first polarization beam splitter 812. At the time when the magnetooptic effect element 220 is spontaneously magnetized in the absence of the magnetic field Ha, as shown in FIG. 19, the plane of polarization of the polarized light components are respectively rotated by the magnetooptic effect element 220 while the polarized light components pass respectively through the magnetooptic effect element 220 and the reflecting prism 260 in the absence of the applied magnetic field Ha. At this time, the modulated polarized light components are received by the first photo diode 951.

Figure 20:
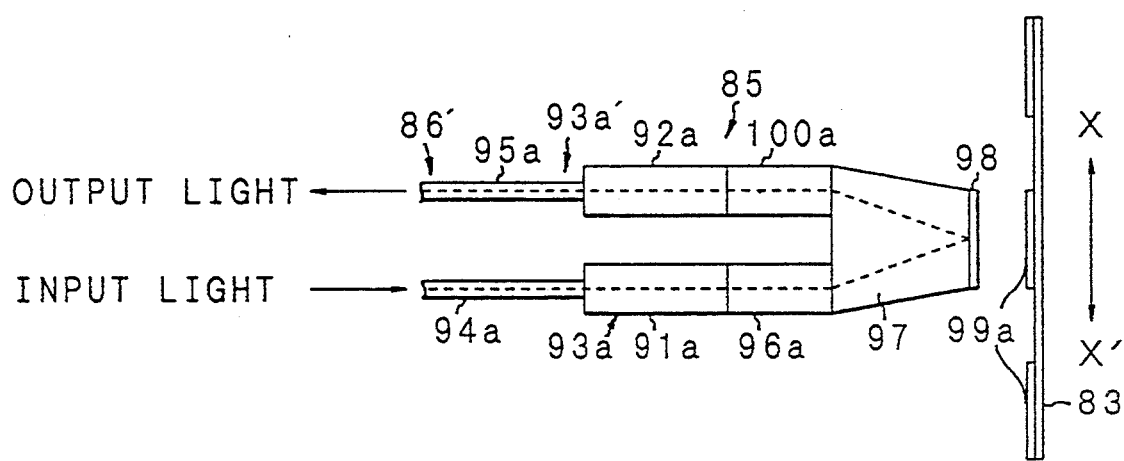
FIG. 20 is a plan view of the prior-art optical sensor head.

On the other hand, at the time when the magnetic field Ha is applied to the magnetooptic effect element 220 by the magnetic coil of the magnetic field applying means, as shown in FIG. 20, the planes of polarization of the polarized light components are respectively maintained by the magnetooptic effect element 220 while the polarized light components pass through the magnetooptic effect element 220 in the presence of the applied magnetic field Ha. At this time, the modulated light components are received by the second photo diode 952.

The optical switch makes one of the optical transmission lines between the semiconductor laser 111 and the first photo diode 951 and breaks the other of the optical transmission lines between the semiconductor laser 111 and the second photo diode 952 when the magnetooptic effect element 220 is spontaneously magnetized in the absence of the applied magnetic field Ha, while the optical switch breaks one of the optical transmission lines between the semiconductor laser 111 and the first photo diode 951 and makes the other of the optical transmission lines between the semiconductor laser 111 and the second photo diode 952 when the magnetic field Ha is applied to the magnetooptic effect element 220 by the magnetic coil of the magnetic field applying means.

Thus, the optical switch is operated by the magnetic coil of the magnetic field applying means to selectively make and break the optical transmission lines between the three optical units.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of magneto-optically modulating light to produce an optical signal, comprising the steps of:

preparing polarized light producing means for producing polarized light linearly polarized on its transmission path and having a plane of polarization rotatable about said transmission path of said polarized light to assume two different positions consisting of a first rotational position in which said polarized light is modulated into a first light component and a second rotational position in which said polarized light is modulated into a second light component, a magnetooptic effect element made of a ferromagnetic substance spontaneously magnetized to have a spontaneous magnetization direction, and magnetic field applying means for applying a magnetic field to said magnetooptic effect element to orient internal magnetization of said magnetooptic effect element;

placing said magnetooptic effect element on said transmission path of said polarized light with the spontaneous magnetization direction of said magnetooptic effect element being substantially parallel with said transmission path of said polarized light, so that the plane of polarization of said polarized light is rotated in a first rotational direction about the transmission path of said polarized light to assume said first rotational position while said polarized light passes through said magnetooptic effect element; and applying said magnetic field to said magnetooptic effect element with said internal magnetization of said magnetooptic effect element being oriented in a direction substantially perpendicular to said transmission path of said polarized light, so that the plane of polarization of said polarized light is rotated in a second rotational direction opposite to said first rotational direction about said transmission path of said polarized light to assume said second rotational position while said polarized light passes through said magnetooptic effect element, said optical signal being constituted by said first and second light components.

2. A method of magneto-optically modulating light as set forth in claim 1, further comprising the step of:

analyzing said first and second light components each passing through said magnetooptic effect element to select one from said first and second light components, said optical signal being constituted only by the selected one of first and second light components.

3. A method of magneto-optically modulating light as set forth in claim 1, wherein said applying step comprises the steps of intermittently applying said magnetic field to said magnetooptic effect element to alternately produce a plurality of first light pulse components formed by the first light components and a plurality of second light pulse components formed by the second light components, said method further comprising the step of analyzing said first and second light pulse components to selectively output said first and second light pulse components, said optical signal being constituted only by the outputted light pulse components.

4. A method of magneto-optically modulating light to produce an optical signal, comprising the steps of:

preparing polarized light producing means for producing polarized light linearly polarized on its transmission path and having a plane of polarization rotatable about said transmission path of said polarized light to assume two different positions consisting of a first rotational position in which said polarized light is modulated into a first light component and a second rotational position in which said polarized light is modulated into a second light component, a magnetooptic effect element made of a ferromagnetic substance spontaneously magnetized to have a spontaneous magnetization direction, and magnetic field applying means for applying a magnetic field to said magnetooptic effect element to orient internal magnetization of said magnetooptic effect element;

placing said magnetooptic effect element on said transmission path of said polarized light with the spontaneous magnetization direction of said magnetooptic effect element being substantially perpendicular to said transmission path of said polarized light;

applying said magnetic field to said magnetooptic effect element with said internal magnetization of said magnetooptic effect element being oriented in a direction substantially parallel with said transmission path of said polarized light, so that the plane of polarization of said polarized light is rotated in a first rotational direction about said transmission path of said polarized light to assume said first rotational position while said polarized light passes through said magnetooptic effect element; and removing said magnetic field applied to said magnetooptic effect element on said transmission path of said polarized light, so that the plane of polarization of said polarized light is rotated in a second rotational direction to assume said second rotational position while said polarized light passes through said magnetooptic effect element, said optical signal being constituted by said first and second light components.

5. A method of magneto-optically modulating light as set forth in claim 4, further comprising the step of:

analyzing said first and second light components each passing through said magnetooptic effect element to select one from said first and second light components, said optical signal being constituted only by the selected one of first and second light components.

6. A method of magneto-optically modulating light as set forth in claim 4, wherein said applying step comprises the steps of intermittently applying said magnetic field to said magnetooptic effect element to alternately produce a plurality of first light pulse components formed by the first light components and a plurality of second light pulse components formed by the second light components, said method further comprising the step of analyzing said first and second light pulse components to selectively output said first and second light pulse components, said optical signal being constituted only by the outputted light pulse components.

7. A position sensing apparatus utilizing magnetooptic modulation, comprising:

polarized light producing means for producing polarized light linearly polarized on its transmission path and having a plane of polarization rotatable about said transmission path of the polarized light to assume two different rotational positions consisting of first rotational position in which said polarized light is modulated into a first light component and a second rotational position in which said polarized light is modulated into a second light component;

a magnetooptic effect element made of a ferromagnetic substance spontaneously magnetized and placed on said transmission path of said polarized light to have a spontaneous magnetization direction substantially parallel with said transmission path of said polarized light, said plane of polarization of said polarized light being rotated by said magnetooptic effect element at a specific rotational angle to assume said first rotational position while said polarized light passes through said substance;

a magnetic field applying unit applying a magnetic field to said magnetooptic effect element to orient internal magnetization of said magnetooptic effect element in a direction substantially perpendicular to said transmission path of said polarized light, the rotational angle of the plane of polarization of said polarized light being reduced by said magnetic field applying unit to allow the plane of polarization to shift from said first rotational position to said second rotational position while said polarized light passes through said substance, said magnetic field applying unit and said magnetooptic effect element being movable with respect to each other; and optically analyzing means for analyzing said first and second light components each passing through said magnetooptic effect element to select one from said first and second light components, said optical signal being constituted by said first and second light components.

8. A position sensing apparatus as set forth in claim 7, wherein said polarized light producing means includes a light source emitting light on its transmission path, a polarizer linearly polarizing said light to have the plane of polarization, and an optical wave guiding means for guiding said light emitted from said light source along said transmission path of said light and transmitting said light from said light source to said polarizer.

9. A position sensing apparatus as set forth in claim 8, wherein said optical wave guiding means includes an optical wave guiding element having a substrate portion connected to one end portion of said magnetooptic effect element and a wave guiding element layer portion lying on said substrate portion.

10. A position sensing apparatus as set forth in claim 7, further comprising:
photo-electric converting means for converting the selected one of said first and second light components to an electric signal.

11. A position sensing apparatus as set forth in claim 10, further comprising:
a reflecting element connected to one end portion of said magnetooptic effect element;
a first optical wave transmitting unit for transmitting the polarized light from said polarized light producing means to the other end portion of said magnetooptic effect element; and
a second optical wave transmitting unit for transmitting the selected one of said first and second light components from the other end portion of said magnetooptic effect element to said photoelectric converting means.

12. A position sensing apparatus as set forth in claim 11, wherein said first and second optical wave transmitting units respectively include first and second optical wave guiding elements each forming an optical transmission path, the optical transmission paths of said first and second optical wave guiding elements partly sharing a unitary optical transmission path.

13. A position sensing apparatus as set forth in claim 7, wherein said polarized light producing means has a polarizing element, and wherein said optically analyzing means has an analyzing element, the polarizing element of the optically analyzing means and the analyzing element of said optically analyzing means constituting an identical optical element.

14. A position sensing apparatus as set forth in claim 7, wherein said polarized light producing means and said optically analyzing means respectively having polarization beam splitters.

15. A position sensing apparatus as set forth in claim 7, wherein said magnetic field applying unit is movable with respect to said magnetooptic effect element in a predetermined movement direction and has a plurality of magnets aligned in said predetermined movement direction in spaced-apart relationship to each other.

16. A position sensing apparatus utilizing magnetooptic modulation to perform multiplexing detection, comprising:
polarized light producing means for producing a plurality of polarized lights linearly polarized on their respective transmission paths and each having a plane of polarization rotatable about the transmission path of each of said polarized lights to assume two different rotational positions consisting of a first rotational position in which said polarized light is modulated into a first light component and a second rotational position in which said polarized light is modulated into a second light component;
a magnetooptic effect element having a plurality of ferromagnet segments each made of a ferromagnetic substance spontaneously magnetized to have a spontaneous magnetization direction substantially parallel with each of said transmission paths of said polarized lights and respectively placed on said transmission paths of said polarized lights, each of said planes of polarization of said polarized lights being rotated at a specific rotational angle about each of said transmission paths of said polarized lights to assume said first rotational position while said each of said polarized lights passes through said magnetooptic effect element;
a magnetic field applying unit having a plurality of magnetic scale members respectively facing to the ferromagnet segments of said magnetooptic effect element and each applying a magnetic field to each of the ferromagnet segments of said magnetooptic effect element to orient internal magnetization of each of said ferromagnet segments in a direction substantially perpendicular to said transmission paths of said polarized lights, each of said planes of polarization of said polarized lights assuming said second rotational position while each of said polarized lights passes through said magnetooptic effect element, said magnetic field applying unit and said magnetooptic effect element being movable with respect to each other; and
optically analyzing means for analyzing said first and second light components each passing through one of the ferromagnet segments of said magnetooptic effect element and selectively outputting said first and second light components, the outputted one of said first and second light components constituting each of a plurality of optical signals to be used for the multiplexing detection.

17. A position sensing apparatus as set forth in claim 16, further comprising an optical delay element located on one of said transmission paths of said polarized lights to cause one of said polarized lights to delay for a predetermined delay time, said first and second light components each passing through said magnetooptic effect element and being analyzed to form a plurality of optical signals to be used for time division multiplexing detection.

18. A position sensing apparatus as set forth in claim 16, wherein said polarized light producing means includes a plurality of light sources emitting a plurality of lights respectively having different wavelengths, said first and second light components being analyzed to form into a plurality of optical signals to be used for wavelength multiplexing detection.

19. A position sensing apparatus utilizing magnetooptic modulation to perform multiplexing detection, comprising:
polarized light producing means for producing a plurality of polarized lights linearly polarized on their respective transmission paths and each having a plane of polarization rotatable about the transmission path of each of said polarized lights to assume two different rotational positions consisting of a first rotational position in which said polarized light is modulated into a first light component and a second rotational position in which said polarized light is modulated into a second light component;
a magnetooptic effect element having a plurality of ferromagnet segments each made of a ferromagnetic substance spontaneously magnetized to have a spontaneous magnetization direction substantially perpendicular to each of said transmission paths of said polarized lights and respectively placed on said transmission paths of said polarized lights, each of said planes of polarization of said polarized lights assuming said first rotational position while each of said polarized lights passes through said magnetooptic effect element;
a magnetic field applying unit having a plurality of magnetic scale members respectively facing to the ferromagnet segments of said magnetooptic effect element and each applying a magnetic field to each of the ferromagnet segments of said magnetooptic effect element to orient internal magnetization of each of said ferromagnet segments in a direction substantially parallel with said transmission paths of said polarized lights, each of said planes of polarization of said polarized lights being rotated at a specific rotational angle about each of said transmission paths of said polarized lights to assume said first rotational position while said each of said polarized lights passes through said magnetooptic effect element said magnetic field applying unit and said magnetooptic effect element being movable with respect to each other; and optically analyzing means for analyzing said first and second light components each passing through one of the ferromagnet segments of said magnetooptic effect element and selectively outputting said first and second light components, the outputted one of said first and second light components constituting each of a plurality of optical signals to be used for the multiplexing detection.

20. A position sensing apparatus as set forth in claim 19, further comprising an optical delay element located on one of said transmission paths of said polarized lights to cause one of said polarized lights to delay for a predetermined delay time, said first and second light components each passing through said magnetooptic effect element and being analyzed to form a plurality of optical signals to be used for time division multiplexing detection.

21. A position sensing apparatus as set forth in claim 19, wherein said polarized light producing means includes a plurality of light sources emitting a plurality of lights respectively having different wavelengths, said first and second light components being analyzed to form a plurality of optical signals to be used for wavelength multiplexing.

22. A position sensing apparatus utilizing magnetooptic modulation, comprising:
polarized light producing means for producing polarized light linearly polarized on its transmission path and having a plane of polarization rotatable about said transmission path of the polarized light to assume two different rotational positions consisting of first rotational position in which said polarized light is modulated into a first light component and a second rotational position in which said polarized light is modulated into a second light component, said plane of polarization initially assuming said first rotational position;
a magnetooptic effect element made of a ferromagnetic substance spontaneously magnetized and placed on said transmission path of said polarized light to have a spontaneous magnetization direction substantially perpendicular to said transmission path of said polarized light;
a magnetic field applying unit for applying a magnetic field to said magnetooptic effect element to orient internal magnetization of said magnetooptic effect element in a direction substantially parallel with said transmission path of said polarized light, said plane of polarization of said polarized light being rotated by said magnetooptic effect element under the influence of the applied magnetic field at a specific rotational angle to assume said second rotational position while said polarized light passes through said magnetooptic effect element in the presence of the applied magnetic field, said plane of polarization of said polarized light being maintained to assume said first rotational position while said polarized light passes through said magnetooptic effect element in the absence of the applied magnetic field, said magnetic field applying unit and said magnetooptic effect element being movable with respect to each other; and optically analyzing means for analyzing said first and second light components each passing through said magnetooptic effect element to select one from said first and second light components, said optics/signs/being constituted by said first and second light components.

23. A position sensing apparatus as set forth in claim 22, wherein said polarized light producing means and said optically analyzing means respectively having polarization beam splitters.

24. A position sensing apparatus as set forth in claim 22, wherein said magnetic field applying unit is movable with respect to said magnetooptic effect element in a predetermined movement direction and has a plurality of magnets aligned in said predetermined movement direction in spaced-apart relationship to each other.

25. A position sensing apparatus as set forth in claim 22, wherein said polarized light producing means includes a light source emitting light on its transmission path, a polarizer linearly polarizing said light to have the plane of polarization, and an optical wave guiding means for guiding said light emitted from said light source along said transmission path of said light and transmitting said light from said light source to said polarizer.

26. A position sensing apparatus as set forth in claim 25, wherein said optical wave guiding means includes an optical wave guiding element having a substrate portion connected to one end portion of said magnetooptic effect element and a wave guiding element layer portion lying on said substrate portion.

27. A position sensing apparatus as set forth in claim 22, further comprising:
photo-electric converting means for converting the selected one of said first and second light components to an electric signal.

28. A position sensing apparatus as set forth in claim 27, further comprising:
a reflecting element connected to one end portion of said magnetooptic effect element;
a first optical wave transmitting unit for transmitting the polarized light from said polarized light producing means to the other end portion of said magnetooptic effect element; and
a second optical wave transmitting unit for transmitting the selected one of said first and second light components from the other end portion of said magnetooptic effect element to said photoelectric converting means.

29. A position sensing apparatus as set forth in claim 28, wherein said first and second optical wave transmitting units respectively include first and second optical wave guiding elements each forming an optical transmission path, the optical transmission paths of said first and second optical wave guiding elements partly sharing a unitary optical transmission path.

30. A position sensing apparatus as set forth in claim 22, wherein said polarized light producing means has a polarizing element, and wherein said optically analyzing means has an analyzing element, the polarizing element of the optically analyzing means and the analyzing element of said optically analyzing means constituting an identical optical element.

31. An optical switch utilizing magnetooptic modulation to make and break an optical transmission line between two optical units one of which produces polarized light linearly polarized on its transmission path to have a plane of polarization rotatable about two different rotational positions consisting of a first rotational position in which said polarized light is modulated into a first light component and a second rotational position in which said polarized light is modulated into a second light component, said optical switch comprising:

- a magnetooptic effect element put in position between said two optical units and made of a ferromagnetic substance spontaneously magnetized to have a spontaneous magnetization direction substantially parallel with said transmission path of said polarized light, the rotational position of said plane of polarization of said polarized light being shifted by said magnetooptic effect element to said first rotational position from said second rotational position while said polarized light passes through said magnetooptic effect element in the absence of applied magnetic field;
- a magnetic field applying unit applying a magnetic field to said magnetooptic effect element to orient internal magnetization of said magnetooptic effect element in a direction substantially perpendicular to said transmission path, the rotational position of said plane of polarization of said polarized light being shifted by said internal magnetization of said magnetooptic effect element to second rotational position from first rotational position while said polarized light passes through said magnetooptic effect element in the presence of said magnetic field; and
- optically analyzing means for analyzing said first and second light components each passing trough said magnetooptic effect element and selectively outputting one of said first and second light components to be received by the other of said two optical units.

32. An optical switch utilizing magnetooptic modulation as set forth in claim 31, wherein said optically analyzing means having polarization beam splitters.

33. An optical switch utilizing magnetooptic modulation to make and break an optical transmission line between two optical units one of which produces polarized light linearly polarized on its transmission path to have a plane of polarization rotatable about two different rotational positions consisting of a first rotational position in which said polarized light is modulated into a first light component and a second rotational position in which said polarized light is modulated into a second light component, said optical switch comprising:

- a magnetooptic effect element put in position between said two optical units and made of a ferromagnetic substance spontaneously magnetized to have a spontaneous magnetization direction substantially perpendicular to said transmission path of said polarized light, the rotational position of said plane of polarization of said polarized light being shifted by said spontaneous magnetization of said magnetooptic effect element to said first rotational position from said second rotational position while said polarized light passes through said magnetooptic effect element;
- a magnetic field applying unit applying a magnetic field to said magnetooptic effect element to orient internal magnetization of said magnetooptic effect element in a direction substantially perpendicular to said transmission path, the rotational position of said plane of polarization of said polarized light being shifted by said internal magnetization of said magnetooptic effect element to said second rotational position from said first rotational position while said polarized light passes through said magnetooptic effect element in the presence of said magnetic field; and
- optically analyzing means for analyzing said first and second light components each passing through said magnetooptic effect element and selectively outputting one of said first and second Light components to be received by the other of said two optical units.

34. An optical switch utilizing magnetooptic modulation as set forth in claim 33, wherein said optically analyzing means having polarization beam splitters.

* * * * *